(12) United States Patent
Yamauchi

(10) Patent No.: US 11,856,340 B2
(45) Date of Patent: Dec. 26, 2023

(54) POSITION SPECIFYING METHOD AND SIMULATION METHOD

(71) Applicant: SEIKO EPSON CORPORATION, Tokyo (JP)

(72) Inventor: Taisuke Yamauchi, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 21 days.

(21) Appl. No.: 17/561,040

(22) Filed: Dec. 23, 2021

(65) Prior Publication Data

US 2022/0210385 A1    Jun. 30, 2022

(30) Foreign Application Priority Data

Dec. 25, 2020   (JP) ................. 2020-216570

(51) Int. Cl.
| | |
|---|---|
| *G03B 21/14* | (2006.01) |
| *H04N 9/31* | (2006.01) |
| *G01B 11/25* | (2006.01) |
| *G01B 11/00* | (2006.01) |
| *G01B 11/02* | (2006.01) |

(52) U.S. Cl.
CPC ......... *H04N 9/3185* (2013.01); *G01B 11/002* (2013.01); *G01B 11/022* (2013.01); *G01B 11/2518* (2013.01); *G03B 21/14* (2013.01)

(58) Field of Classification Search
CPC .... H04N 9/3185; H04N 9/3194; G03B 21/14; G03B 21/147; G01B 11/2545
See application file for complete search history.

(56) References Cited

U.S. PATENT DOCUMENTS

| | | | |
|---|---|---|---|
| 2016/0088275 A1 | 3/2016 | Fuchikami | |
| 2016/0343125 A1 | 11/2016 | Keitler et al. | |
| 2017/0039756 A1* | 2/2017 | Moule | G06T 7/593 |
| 2020/0099906 A1 | 3/2020 | Sugisawa et al. | |

FOREIGN PATENT DOCUMENTS

| | | |
|---|---|---|
| JP | 2015-173431 A | 10/2015 |
| JP | 2018-097148 A | 6/2018 |
| JP | 2019-047312 A | 3/2019 |

* cited by examiner

*Primary Examiner* — Ryan D Howard
(74) *Attorney, Agent, or Firm* — Oliff PLC

(57) ABSTRACT

A position specifying method includes generating relation information based on first coordinates and second coordinates, the first coordinates indicating coordinates of a portion of a target object in three dimensions, at which a specific point is located, in a state where a projector projects the projection image having the specific point onto the target object, the second coordinates indicating coordinates of the specific point in the projection image in two dimensions, the relation information indicating a correspondence between a three-dimensional coordinate system and a projector coordinate system, the three dimensional coordinate system being used by a measuring instrument that specifies the first coordinates, the projector coordinate system defining the second coordinates and coordinates of the projector, and specifying a position of the projector in the three-dimensional coordinate system based on the coordinates of the projector, by using the relation information.

10 Claims, 12 Drawing Sheets

POSITION SPECIFYING METHOD AND SIMULATION METHOD

The present application is based on, and claims priority from JP Application Serial Number 2020-216570, filed Dec. 25, 2020, the disclosure of which is hereby incorporated by reference herein in its entirety.

BACKGROUND

1. Technical Field

The present disclosure relates to a position specifying method and a simulation method.

2. Related Art

U.S. Patent Application Publication No. 2016/0343125 discloses a system that projects a predetermined image on a target object by using a pair of a projector and a camera. In this system, the positional relation between the projector and the camera is determined in advance.

In the system disclosed in described in U.S. Patent Application Publication No. 2016/0343125, since the positional relation between the projector and the camera is determined in advance, there is a concern that it is not possible to dispose the projector and a measuring instrument such as the camera at certain positions. Therefore, a technique capable of supporting the projection of a predetermined image on a target object even when the projector and the measuring instrument such as a camera are disposed at any positions is desired.

SUMMARY

A position specifying method according to an aspect of the present disclosure includes generating relation information based on first coordinates of a portion of a target object in three dimensions, at which a specific point is located, and second coordinates of the specific point in a projection image in two dimensions in a state where a projector projects the projection image having the specific point onto the target object, the relation information indicating a correspondence between a three-dimensional coordinate system used by a measuring instrument that specifies the first coordinates and a projector coordinate system for defining the second coordinates and coordinates of the projector, and specifying a position of the projector in the three-dimensional coordinate system based on the coordinates of the projector, by using the relation information.

A simulation method according to another aspect of the present disclosure includes generating first relation information based on first coordinates of a portion of a target object in three dimensions, at which a first specific point is located, and second coordinates of the first specific point in a projection image in two dimensions in a state where a projector projects the projection image having the first specific point onto the target object, the first relation information indicating a correspondence between a three-dimensional coordinate system used by a measuring instrument that specifies the first coordinates and a projector coordinate system for defining the second coordinates and coordinates of the projector, generating second relation information based on coordinates of a second specific point in the target object in the three-dimensional coordinate system and coordinates of a third specific point corresponding to the second specific point, in a three-dimensional virtual space, the second relation information indicating a correspondence between the three-dimensional coordinate system and a virtual space coordinate system for defining coordinates in the virtual space, and specifying a position of the projector in the virtual space coordinate system based on the coordinates of the projector, by using the first relation information and the second relation information.

A simulation method according to still another aspect of the present disclosure includes generating first information based on image pickup coordinates being two-dimensional coordinates of a portion of a pickup image, at which a first specific point is located, and projection coordinates being two-dimensional coordinates of the first specific point in a projection image, in a state where a projector projects the projection image having the first specific point onto a target object, the pickup image being generated by a camera capturing the target object, the first information indicating a correspondence between a camera coordinate system for defining the image pickup coordinates and a projector coordinate system for defining the projection coordinates and coordinates of the projector, generating second information based on coordinates of a second specific point in the target object in the camera coordinate system and coordinates of a third specific point corresponding to the second specific point, in a three-dimensional virtual space, the second information indicating a correspondence between the camera coordinate system and a virtual space coordinate system indicating coordinates in the virtual space, and specifying a position of the projector in the virtual space coordinate system based on the coordinates of the projector, by using the first information and the second information.

DESCRIPTION OF EXEMPLARY EMBODIMENTS

A: Embodiment

A1: Outline of Projection System 1

Figure 1:
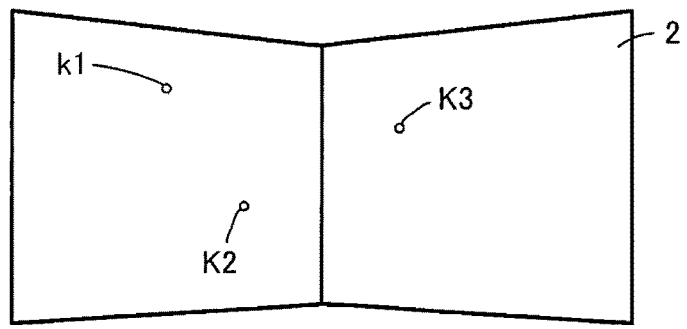
FIG. 1 is a diagram illustrating a projection system according to an embodiment.

FIG. 1 is a diagram illustrating a projection system 1 according to an embodiment. The projection system 1 is an example of each of a position specifying system and a simulation system.

The projection system 1 projects an image onto a target object 2. The target object 2 is the wall of a room. The wall of the room is an example of an object as a projection target. The object as the projection target is not limited to the wall of the room, but may be the outer wall of a building or a product, for example. The target object 2 is not limited to the object as the projection target, and may be an object in being manufactured or an object under inspection, for example. The object in being manufactured includes, for example, automobiles in being manufactured, trains in being manufactured, aircraft in being manufactured, electrical appliances in being manufactured, or buildings under construction. The object under inspection includes, for example, automobiles under inspection, trains under inspection, aircraft under inspection, electrical appliances under inspection, or buildings under inspection. The form of the target object 2 is not limited to the form illustrated in FIG. 1, and can be appropriately changed.

The target object 2 has three target points, specifically, a first target point k1, a second target point k2, and a third target point k3. When it is not necessary to distinguish the first target point k1 to the third target point k3 from each other, each of the first target point k1 to the third target point k3 is referred to as a "target point k". The target point k is an example of a second specific point. The target object 2 may have four or more target points k.

The projection system 1 includes a projector 100, a measuring instrument 200, and an information processing apparatus 300.

Figure 2:
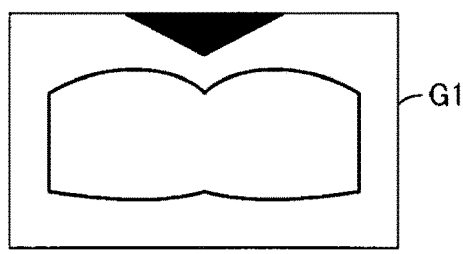
FIG. 2 is a diagram illustrating an example of a deformed image.
Figure 3:
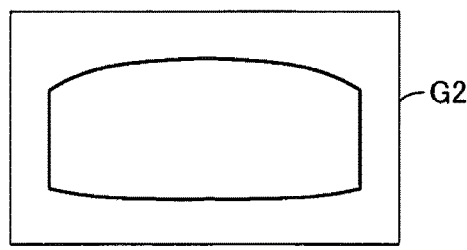
FIG. 3 is a diagram illustrating an original image being a source of the deformed image.

The projector 100 projects a deformed image G1 onto the target object 2. FIG. 2 is a diagram illustrating an example of the deformed image G1. The deformed image G1 is an image deformed in accordance with the shape of the target object 2. FIG. 3 is a diagram illustrating an original image G2 being a source of the deformed image G1. The original image G2 is an example of a first image. The deformed image G1 is an example of a second image.

Figure 4:
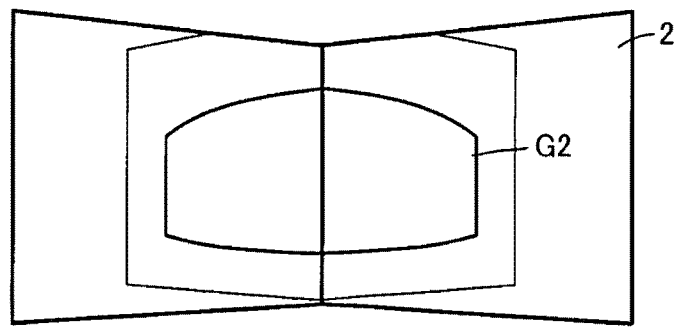
FIG. 4 is a diagram illustrating an example of deformation of the original image.

In a state where the original image G2 is projected from the projector 100 onto the target object 2, the original image G2 shown on the target object 2 is deformed in accordance with the shape of the target object 2, as illustrated in FIG. 4. The original image G2 is deformed in accordance with the shape of the target object 2 due to that the image projected from the projector 100 becomes larger as the distance from the projector 100 to a projection destination of the image becomes longer. The deformation that occurs in the original image G2 projected onto the target object 2 is referred to as "first deformation" below.

The deformed image G1 is obtained by causing second deformation which is cancelled by the first deformation to occur in the original image G2.

Figure 5:
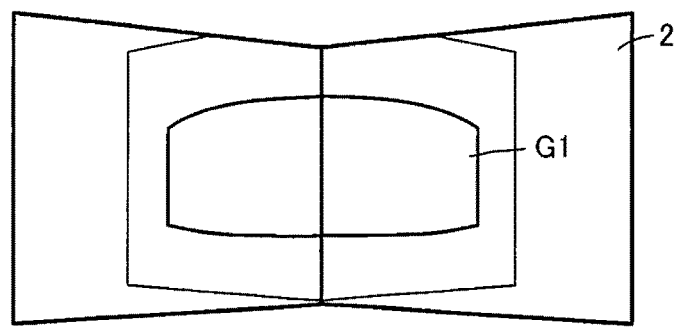
FIG. 5 is a diagram illustrating a projection example of the deformed image.

In a state where the deformed image G1 is projected from the projector 100 onto the target object 2, the first deformation occurs in the deformed image G1 to be projected onto the target object 2. Such first deformation cancels out the second deformation in the deformed image G1. Therefore, as illustrated in FIG. 5, the deformed image G1 is shown on the target object 2 in the similar form to the original image G2.

In the industrial field, when it is desired to allow a manufacturing method of the target object 2 or an inspection method of the target object 2 to be visually recognized on the target object 2 by texts or the like, the deformed image G1 may be generated based on the original image G2 indicating the manufacturing method of the target object 2 or an inspection method of the target object 2 to be visually recognized, by texts or the like.

The measuring instrument 200 performs three-dimensional measurement on the target object 2. The information processing apparatus 300 generates the deformed image G1 by using the projector 100 and the measuring instrument 200.

Figure 6:
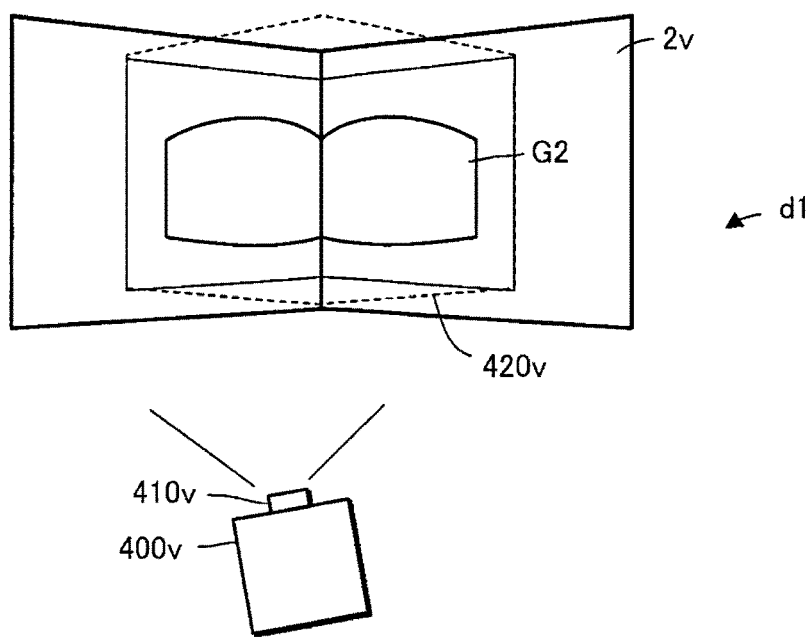
FIG. 6 is a diagram illustrating an example of image simulation in a virtual space.

As illustrated in FIG. 6, the information processing apparatus 300 generates the deformed image G1 by simulating an image in a virtual space d1.

First, the information processing apparatus 300 disposes a virtual target object 2v having the same shape as the shape of a target object 2, in the virtual space d1.

Then, the information processing apparatus 300 displays an original image G2 on the virtual target object 2v so that it seems that virtual paper representing the original image G2 is adhered to the virtual target object 2v.

The information processing apparatus 300 disposes a virtual camera 400v in the virtual space d1.

Specifically, the information processing apparatus 300 disposes the virtual camera 400v so that the positional relation between the virtual camera 400v and the virtual target object 2v coincides with the positional relation between the projector 100 and the target object 2.

The virtual camera 400v includes a virtual image pickup lens 410v having the same internal parameters as the internal parameters of a projection lens 140 of the projector 100.

Then, the information processing apparatus 300 generates a virtual pickup image obtained by the virtual camera 400v picking up the original image G2 displayed on the virtual target object 2v, as a deformed image G1. FIG. 6 illustrates an image pickup area 420v of the virtual camera 400v.

When the deformed image G1 is generated by such a method, it is necessary to specify the position of the virtual camera 400v in the virtual space d1. Even when the projector 100 and the measuring instrument 200 are disposed at any positions, the information processing apparatus 300 specifies the position of the virtual camera 400v in the virtual space d1 by using the projector 100 and the measuring instrument 200.

The configuration and the like of the projection system 1 will be described below focusing on a method of specifying the position of the virtual camera 400v in the virtual space d1 and a method of generating the deformed image G1.

A2: Projector 100

Figure 7:
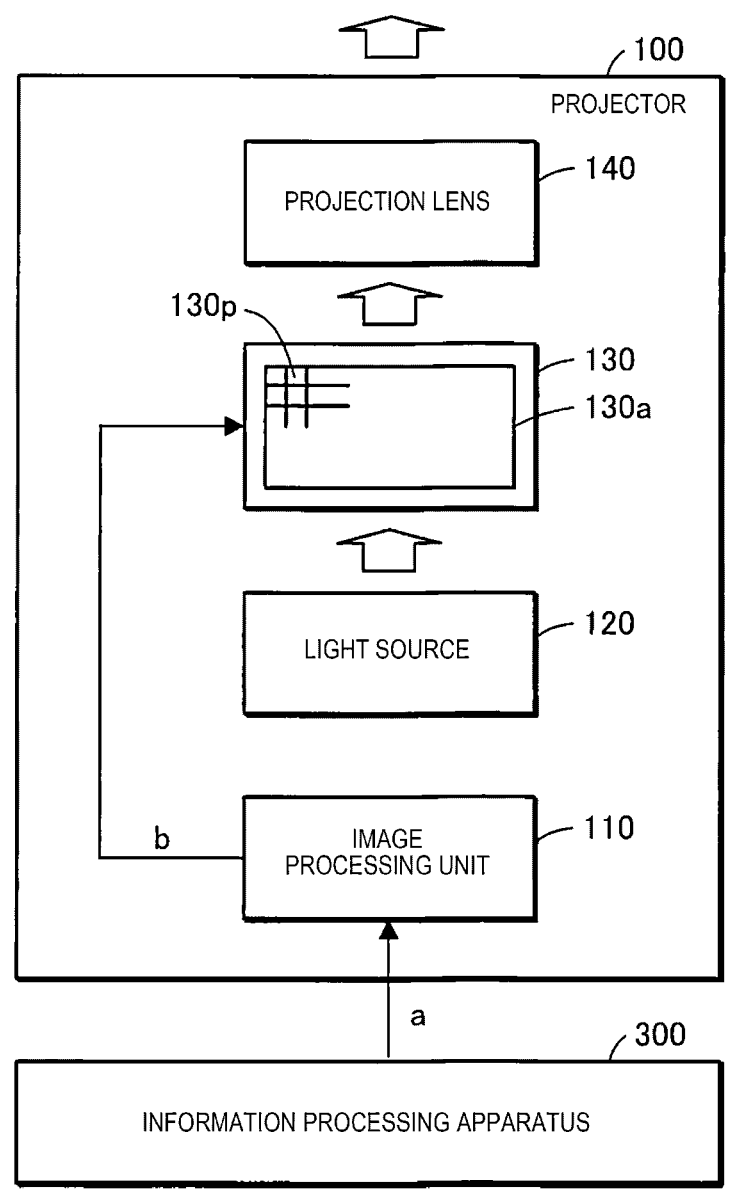
FIG. 7 is a diagram illustrating an example of a projector.

FIG. 7 is a diagram illustrating an example of the projector 100. The projector 100 includes an image processing unit 110, a light source 120, a liquid crystal light bulb 130, and the projection lens 140.

The image processing unit 110 is configured by, for example, a circuit such as an image processing circuit. The image processing unit 110 receives image data a from the information processing apparatus 300. The image processing unit 110 generates a voltage b based on the image data a by performing image processing such as gamma correction on the image data a.

The light source 120 is a light emitting diode (LED). The light source 120 is not limited to the LED, and may be, for example, a xenon lamp or a laser light source.

The liquid crystal light bulb 130 is configured by, for example, a liquid crystal panel in which liquid crystal is provided between a pair of transparent substrates. The liquid crystal light bulb 130 has a rectangular pixel region 130a. The pixel region 130a includes a plurality of pixels 130p located in a matrix.

In the liquid crystal light bulb 130, the voltage b based on the image data a is applied to the liquid crystal of each pixel 130p. When the voltage b based on the image data a is applied to the liquid crystal of each pixel 130p, the pixel 130p is set with the light transmittance based on the image data a.

Light emitted from the light source 120 is modulated by the pixel region 130a of the liquid crystal light bulb 130. The liquid crystal light bulb 130 is an example of an optical modulation device. The light modulated by the liquid crystal light bulb 130 is directed to the projection lens 140. The projection lens 140 projects light modulated by the liquid crystal light bulb 130, that is, an image onto the target object 2.

Figure 8:
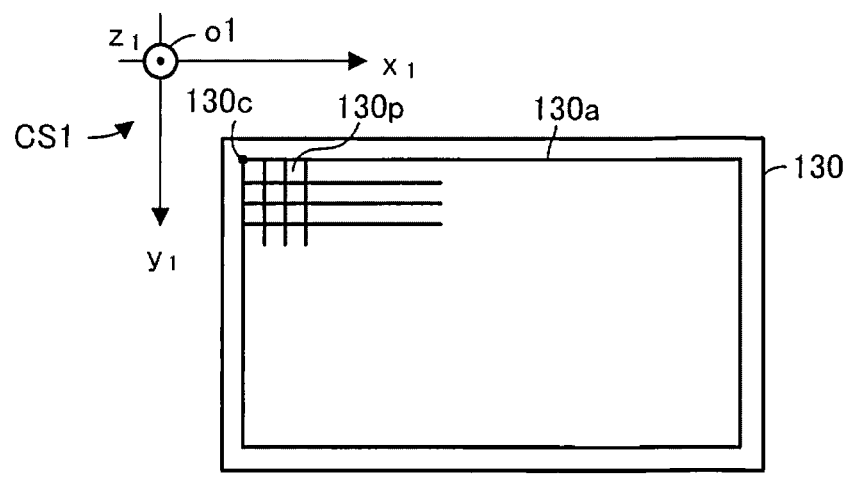
FIG. 8 is a diagram illustrating an example of a projector coordinate system.

A projector coordinate system CS1 is applied to the liquid crystal light bulb 130. FIG. 8 is a diagram illustrating an example of the projector coordinate system CS1. The projector coordinate system CS1 is a two-dimensional coordinate system. An origin o1 of the projector coordinate system CS1 is set at an upper left corner 130c of the pixel region 130a illustrated in FIG. 8. In FIG. 8, for convenience, the origin o1 is illustrated at a position different from the upper left corner 130c.

The position of a principal point of the projection lens 140 is specified by coordinates of the projector coordinate system CS1. The coordinates of the position of the principal point of the projection lens 140 are an example of the coordinates of the projector 100. The coordinates of the projector 100 are not limited to the coordinates of the position of the principal point of the projection lens 140, and may be coordinates in the projector coordinate system CS1.

The projector coordinate system CS1 is defined by an $x_1$ axis and a $y_1$ axis. The $x_1$ axis and the $y_1$ axis are determined in accordance with the orientation of the liquid crystal light bulb 130. The $x_1$ axis is parallel to the horizontal direction of the liquid crystal light bulb 130, that is, parallel to the lateral direction of the liquid crystal light bulb 130. The $y_1$ axis is perpendicular to the $x_1$ axis. The $y_1$ axis is parallel to the vertical direction of the liquid crystal light bulb 130, that is, parallel to the longitudinal direction of the liquid crystal light bulb 130.

FIG. 8 illustrates a $z_1$ axis in addition to the $x_1$ axis and the $y_1$ axis. The $z_1$ axis is perpendicular to each of the $x_1$ axis and the $y_1$ axis. The $z_1$ axis is along the optical axis of the projection lens 140.

The projector 100 projects a measurement image G3 onto the target object 2 in addition to the deformed image G1.

Figure 9:
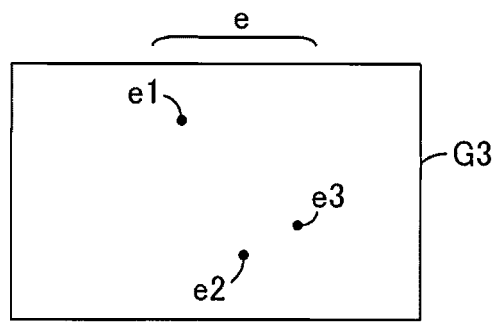
FIG. 9 is a diagram illustrating an example of a measurement image.

FIG. 9 is a diagram illustrating an example of the measurement image G3. The measurement image G3 is used to specify the correspondence between the projector coordinate system CS1 and a measuring instrument coordinate system CS2 included in the measuring instrument 200. Furthermore, the measurement image G3 is used to specify points corresponding to points in the projector coordinate system CS1, in the measuring instrument coordinate system CS2.

The measurement image G3 has a first measurement point e1, a second measurement point e2, and a third measurement point e3. When it is not necessary to distinguish the first measurement point e1 to the third measurement point e3 from each other, each of the first measurement point e1 to the third measurement point e3 is referred to as a "measurement point e". The measurement point e is a portion of the measurement image G3. The measurement point e is an example of a specific point and an example of a first specific point. The measurement image G3 is an example of a projection image having the specific point and an example of a projection image having the first specific point. The measurement image G3 may have four or more measurement points e.

When a plurality of measurement images G3 are used, the measurement point e may be present in each of the plurality of measurement images G3 in a form of being indistinguishable from other portions of the measurement image G3. An example of the plurality of measurement images G3 is a plurality of phase shift images used in a phase shift method. The phase shift image will be described later.

A3: Measuring Instrument 200

Figure 10:
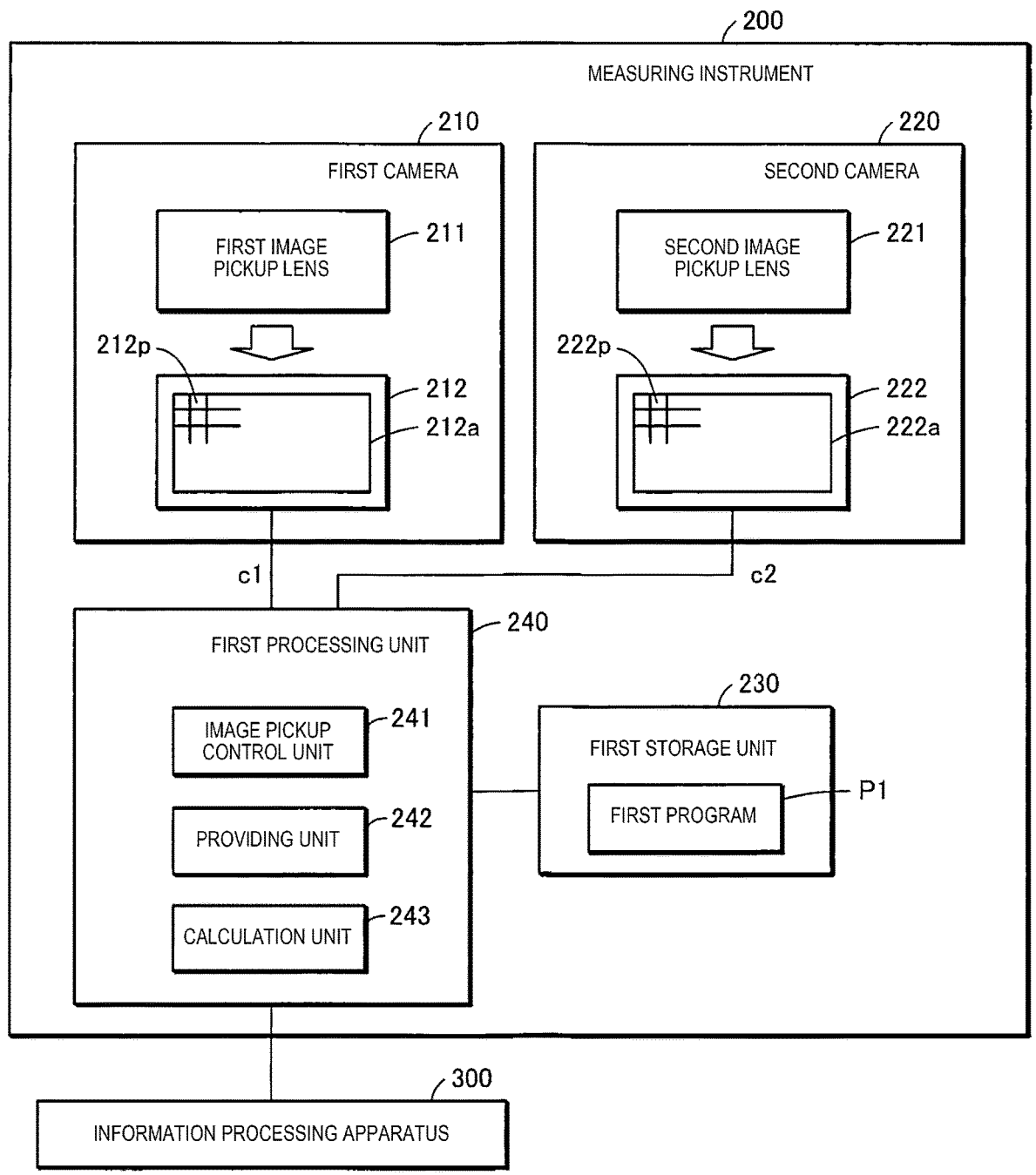
FIG. 10 is a diagram illustrating an example of a measuring instrument.

FIG. 10 is a diagram illustrating an example of the measuring instrument 200. The measuring instrument 200 is a stereo camera. The measuring instrument 200 is not limited to a stereo camera, and may be any device that performs three-dimensional measurement on the target object 2. The measuring instrument 200 has a configuration separate from the projector 100. The measuring instrument 200 may be incorporated in the projector 100 instead of having a configuration separate from the projector 100.

The measuring instrument 200 includes a first camera 210, a second camera 220, a first storage unit 230, and a first processing unit 240. The position of the first camera 210 and the position of the second camera 220 are different from each other.

The first camera 210 includes a first image pickup lens 211 and a first image sensor 212.

The first image pickup lens 211 forms an optical image of the target object 2 on the first image sensor 212. For example, the first image pickup lens 211 forms an optical image of the target object 2 onto which the measurement image G3 is projected, on the first image sensor 212 in a state where the projector 100 projects the measurement image G3 onto the target object 2.

The first image sensor 212 is a charge coupled device (CCD) image sensor. The first image sensor 212 is not limited to the CCD image sensor, and may be, for example, a complementary metal oxide semiconductor (CMOS) image sensor. The first image sensor 212 has a rectangular first image pickup region 212a. The first image pickup region 212a includes a plurality of cells 212p located in a matrix. The first image sensor 212 generates first image pickup data c1 based on the optical image formed by the first image pickup lens 211.

The second camera 220 includes a second image pickup lens 221 and a second image sensor 222.

The second image pickup lens 221 forms an optical image of the target object 2 on the second image sensor 222. For example, the second image pickup lens 221 forms an optical image of the target object 2 onto which the measurement image G3 is projected, on the second image sensor 222 in a state where the projector 100 projects the measurement image G3 onto the target object 2.

The second image sensor 222 is a CCD image sensor. The second image sensor 222 is not limited to the CCD image sensor, and may be, for example, a CMOS image sensor. The second image sensor 222 has a rectangular second image pickup region 222a. The second image pickup region 222a includes a plurality of cells 222p located in a matrix. The second image sensor 222 generates second image pickup data c2 based on the optical image formed by the second image pickup lens 221.

The first storage unit 230 is a recording medium that can be read by the first processing unit 240. The first storage unit 230 includes, for example, a non-volatile memory and a volatile memory. The non-volatile memory is, for example, a read only memory (ROM), an erasable programmable read only memory (EPROM), and an electrically erasable programmable read only memory (EEPROM). The volatile memory is, for example, a random access memory (RAM). The first storage unit 230 stores a first program P1 executed by the first processing unit 240.

The first processing unit 240 is configured by one or a plurality of central processing units (CPUs). The one or the plurality of CPUs are an example of one or a plurality of processors. Each of the processors and the CPUs is an example of a computer.

The first processing unit 240 reads the first program P1 from the first storage unit 230. The first processing unit 240 executes the first program P1 to function as an image pickup control unit 241, a providing unit 242, and a calculation unit 243.

Each of the image pickup control unit 241, the providing unit 242 and the calculation unit 243 may be configured by a circuit such as a digital signal processor (DSP), an application specific integrated circuit (ASIC), a programmable logic device (PLD), and a field programmable gate array (FPGA).

The image pickup control unit 241 controls image pickup performed by the first camera 210 and image pickup performed by the second camera 220.

The providing unit 242 outputs various types of information such as the first image pickup data c1 and the second image pickup data c2 to the information processing apparatus 300.

The calculation unit 243 performs three-dimensional measurement on the target object 2 based on the first image pickup data c1 and the second image pickup data c2. The calculation unit 243 represents the result of the three-dimensional measurement by using the coordinates in the measuring instrument coordinate system CS2.

Figure 11:
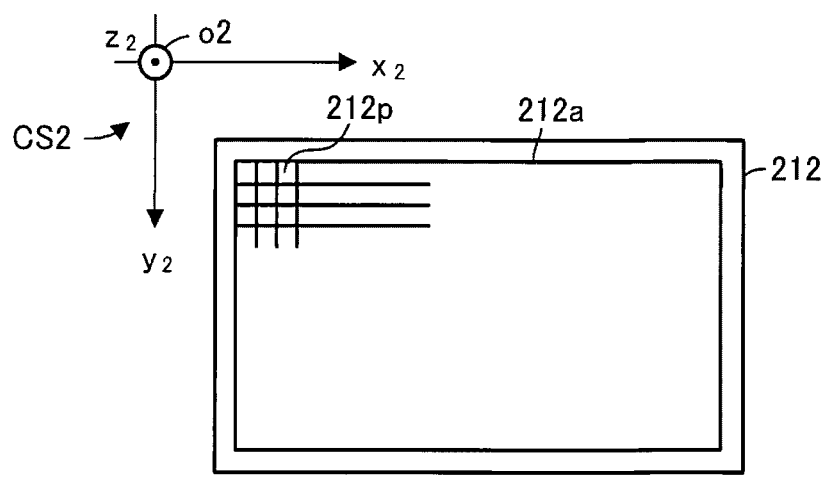
FIG. 11 is a diagram illustrating an example of a measuring instrument coordinate system.

FIG. 11 is a diagram illustrating an example of the measuring instrument coordinate system CS2. The measuring instrument coordinate system CS2 is a three-dimensional coordinate system. An origin o2 of the measuring instrument coordinate system CS2 is set at the position of a principal point of the first image pickup lens 211. The position of the principal point of the first image pickup lens 211 is an example of the position of the measuring instrument 200. In FIG. 11, for convenience, the origin o2 is illustrated at a position different from the position of the principal point of the first image pickup lens 211. The origin o2 of the measuring instrument coordinate system CS2 is not limited to the position of the principal point of the first image pickup lens 211, but may be, for example, the position of a principal point of the second image pickup lens 221. The position of the principal point of the second image pickup lens 221 is another example of the position of the measuring instrument 200.

The measuring instrument coordinate system CS2 is an example of a three-dimensional coordinate system. The measuring instrument coordinate system CS2 is defined by an $x_2$ axis, a $y_2$ axis, and a $z_2$ axis. The $x_2$ axis, the $y_2$ axis and the $z_2$ axis are determined in accordance with the orientation of the measuring instrument 200. The $x_2$ axis, the $y_2$ axis and the $z_2$ axis are perpendicular to each other.

The $x_2$ axis is parallel to the horizontal direction of the first image sensor 212, that is, parallel to the lateral direction of the first image sensor 212. When the origin o2 of the measuring instrument coordinate system CS2 coincides with the position of the principal point of the second image pickup lens 221, the $x_2$ axis is parallel to the horizontal direction of the second image sensor 222, that is, parallel to the lateral direction of the second image sensor 222.

The $y_2$ axis is parallel to the vertical direction of the first image sensor 212, that is, parallel to the longitudinal direction of the first image sensor 212. When the origin o2 of the measuring instrument coordinate system CS2 coincides with the position of the principal point of the second image pickup lens 221, the $y_2$ axis is parallel to the vertical direction of the second image sensor 222, that is, parallel to the longitudinal direction of the second image sensor 222.

The $z_2$ axis coincides with the optical axis of the first image pickup lens 211. When the origin o2 of the measuring instrument coordinate system. CS2 coincides with the position of the principal point of the second image pickup lens 221, the $z_2$ axis coincides with the optical axis of the second image pickup lens 221.

A4: Information Processing Apparatus 300

Figure 12:
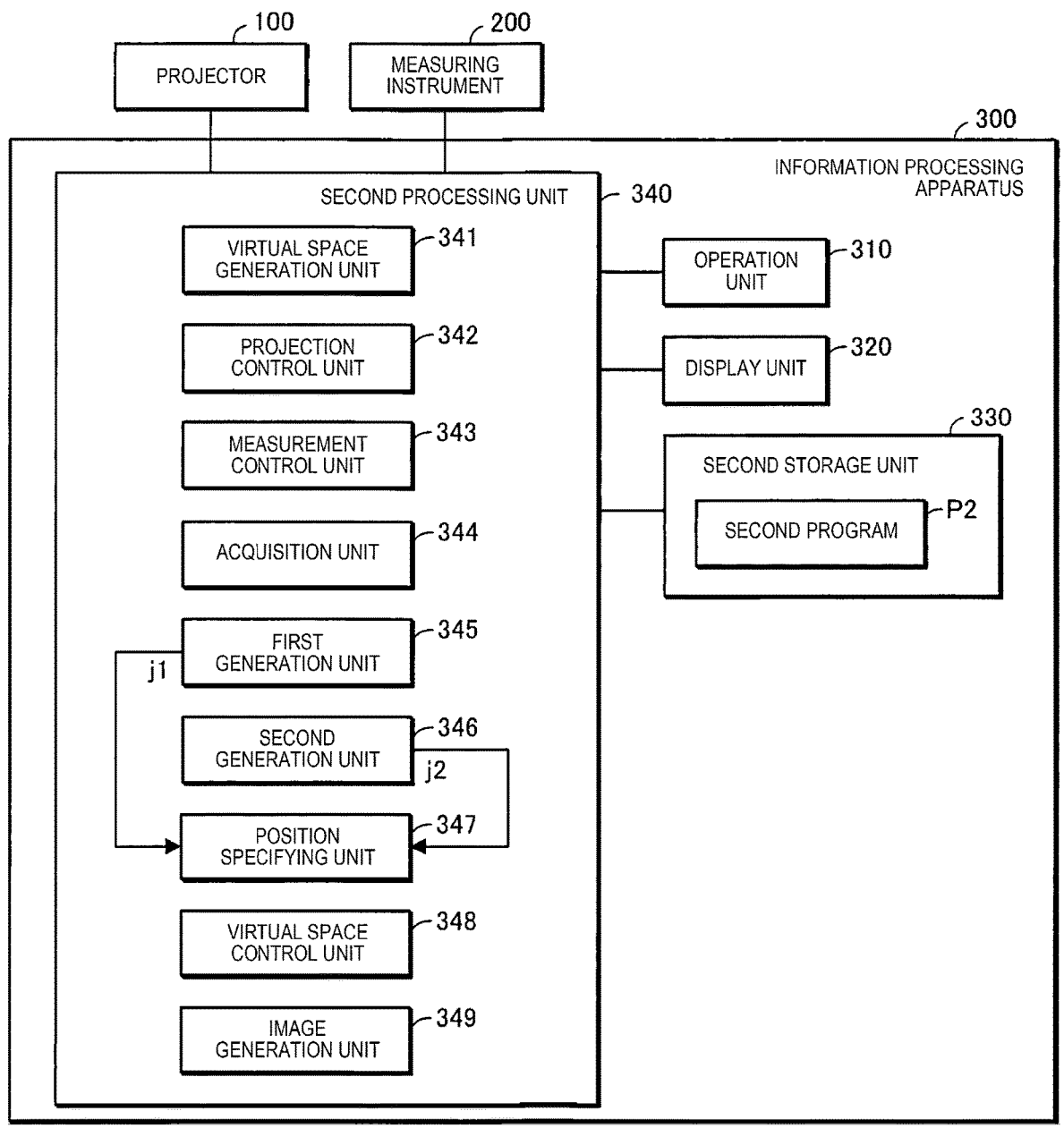
FIG. 12 is a diagram illustrating an example of an information processing apparatus.

FIG. 12 is a diagram illustrating an example of the information processing apparatus 300. The information processing apparatus 300 is a personal computer (PC). The information processing apparatus 300 is not limited to a PC, and may be, for example, a tablet or a smartphone.

The information processing apparatus 300 includes an operation unit 310, a display unit 320, a second storage unit 330, and a second processing unit 340.

The operation unit 310 is, for example, a keyboard, a mouse, operation buttons, operation keys, or a touch panel. The operation unit 310 receives an input operation from a user.

The display unit 320 is a display, for example, a flat panel display (FPD) such as a liquid crystal display, a plasma display, or an organic electroluminescence (EL) display. The display unit 320 displays various types of information.

The second storage unit 330 is a recording medium that can be read by the second processing unit 340. The second storage unit 330 includes, for example, a non-volatile memory and a volatile memory. The second storage unit 330 stores a second program P2 executed by the second processing unit 340.

The second processing unit 340 is configured by one or a plurality of CPUs, for example. The second processing unit 340 reads the second program P2 from the second storage unit 330. The second processing unit 340 executes the second program. P2 to function as a virtual space generation unit 341, a projection control unit 342, a measurement control unit 343, an acquisition unit 344, a first generation unit 345, a second generation unit 346, a position specifying unit 347, a virtual space control unit 348, and an image generation unit 349.

Each of the virtual space generation unit 341, the projection control unit 342, the measurement control unit 343, the acquisition unit 344, the first generation unit 345, the second generation unit 346, the position specifying unit 347, the virtual space control unit 348, and the image generation unit 349 may be configured by a circuit such as a DSP, an ASIC, a PLD, or an FPGA.

Figure 13:
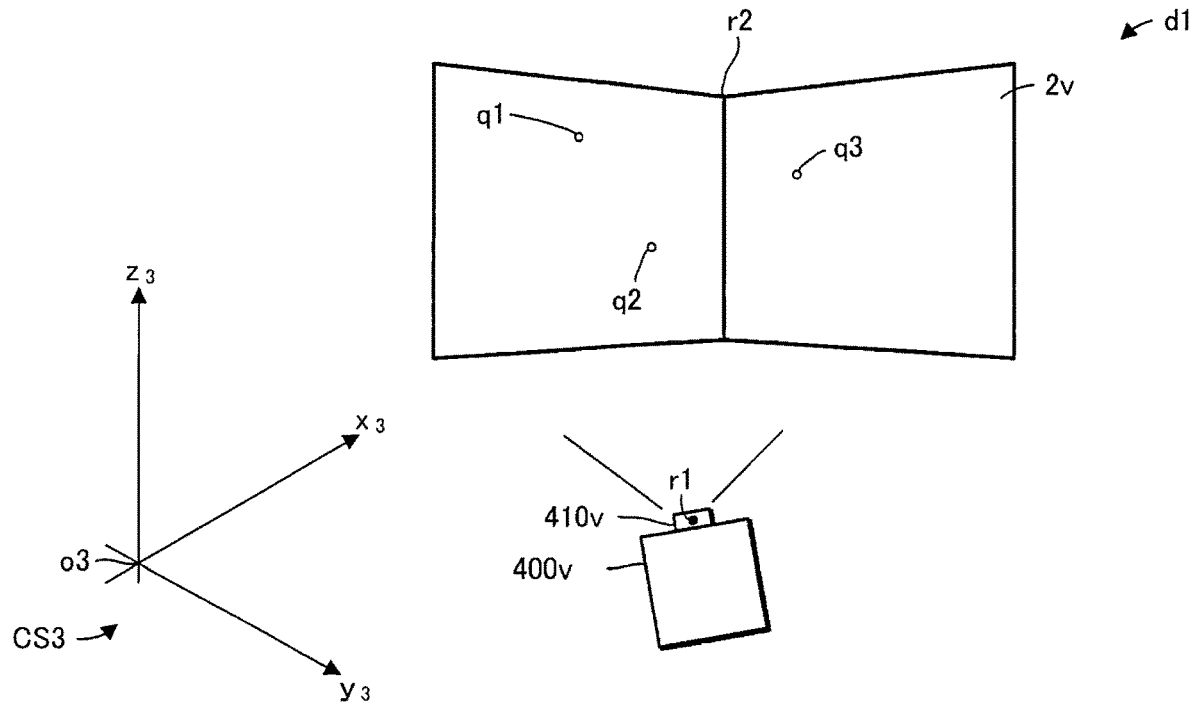
FIG. 13 is a diagram illustrating an example of the virtual space.

The virtual space generation unit 341 generates a three-dimensional virtual space d1. FIG. 13 is a diagram illustrating an example of the virtual space d1. A virtual space coordinate system CS3 is applied to the virtual space d1. The virtual space coordinate system CS3 is a three-dimensional coordinate system. The virtual space coordinate system CS3 is defined by an $x_3$ axis, a $y_3$ axis, and a $z_3$ axis. The $x_3$ axis, the $y_3$ axis, and the $z_3$ axis are perpendicular to each other.

A virtual target object $2v$ is located in the virtual space d1. The virtual target object $2v$ corresponds to the target object 2. The shape of the virtual target object $2v$ is the same as the shape of the target object 2.

The virtual target object $2v$ has three virtual target points, specifically, a first virtual target point q1, a second virtual target point q2, and a third virtual target point q3.

When it is not necessary to distinguish the first virtual target point q1 to the third virtual target point q3 from each other, each of the first virtual target point q1 to the third virtual target point q3 is referred to as a "virtual target point q". The virtual target point q is an example of a third specific point corresponding to the second specific point.

The positional relation between the virtual target object $2v$ and the first virtual target point q1 is the same as the positional relation between the target object 2 and the first target point k1. For example, when the position of the first virtual target point q1 in the virtual target object $2v$ is determined in advance, the position of the first target point k1 in the target object 2 is determined so that the positional relation between the target object 2 and the first target point k1 is the same as the positional relation between the virtual target object $2v$ and the first virtual target point q1.

In this case, for example, a first physical marker is disposed at the position of the first target point k1 in the target object 2. The first physical marker has a reflectance different from the reflectance of the target object 2. Therefore, the first physical marker can be identified in each of the first image pickup data c1 generated by the first camera 210 and the second image pickup data c2 generated by the second camera 220. Thus, it is possible to specify the position of the first physical marker, that is, the position of the first target point k1, based on the first image pickup data c1 and the second image pickup data c2. The first virtual target point q1 corresponds to the first target point k1.

The positional relation between the virtual target object $2v$ and the second virtual target point q2 is the same as the positional relation between the target object 2 and the second target point k2. For example, when the position of the second virtual target point q2 in the virtual target object $2v$ is determined in advance, the position of the second target point k2 in the target object 2 is determined so that the positional relation between the target object 2 and the second target point k2 is the same as the positional relation between the virtual target object $2v$ and the second virtual target point q2.

In this case, for example, a second physical marker is disposed at the position of the second target point k2 in the target object 2. The second physical marker has a reflectance different from the reflectance of each of the target object 2 and the first physical marker. Therefore, the second physical marker can be identified in each of the first image pickup data c1 generated by the first camera 210 and the second image pickup data c2 generated by the second camera 220. Thus, it is possible to specify the position of the second physical marker, that is, the position of the second target point k2, based on the first image pickup data c1 and the second image pickup data c2. The second virtual target point q2 corresponds to the second target point k2.

The positional relation between the virtual target object $2v$ and the third virtual target point q3 is the same as the positional relation between the target object 2 and the third target point k3. For example, when the position of the third virtual target point q3 in the virtual target object $2v$ is determined in advance, the position of the third target point k3 in the target object 2 is determined so that the positional relation between the target object 2 and the third target point k3 is the same as the positional relation between the virtual target object $2v$ and the third virtual target point q3.

In this case, for example, a third physical marker is disposed at the position of the third target point k3 on the target object 2. The third physical marker has a reflectance different from the reflectance of each of the target object 2, the first physical marker, and the second physical marker. Therefore, the third physical marker can be identified in each of the first image pickup data c1 generated by the first camera 210 and the second image pickup data c2 generated by the second camera 220. Therefore, it is possible to specify the position of the third physical marker, that is, the position of the third target point k3, based on the first image pickup data c1 and the second image pickup data c2. The third virtual target point q3 corresponds to the third target point k3.

The description returns to FIG. 12. The projection control unit 342 controls the projector 100. The projection control unit 342 caused the projector 100 to project each of the measurement image G3 and the deformed image G1. The projection control unit 342 caused the projector 100 to project the measurement image G3 by providing the projector 100 with measurement image data indicating the measurement image G3. The measurement image data is an example of the image data a. The projection control unit 342 caused the projector 100 to project the deformed image G1 by providing the projector 100 with deformed image data indicating the deformed image G1. The deformed image data is another example of the image data a.

The measurement control unit 343 controls the measuring instrument 200. The measurement control unit 343 causes the measuring instrument 200 to pick up an image of the target object 2. The measurement control unit 343 causes the measuring instrument 200 to perform three-dimensional measurement on the target object 2.

The acquisition unit 344 acquires, from the measuring instrument 200, the three-dimensional coordinates of a portion of the target object 2, at which the measurement point e of the measurement image G3 is located, in a state where the projector 100 projects the measurement image G3 onto the target object 2.

Figure 14:
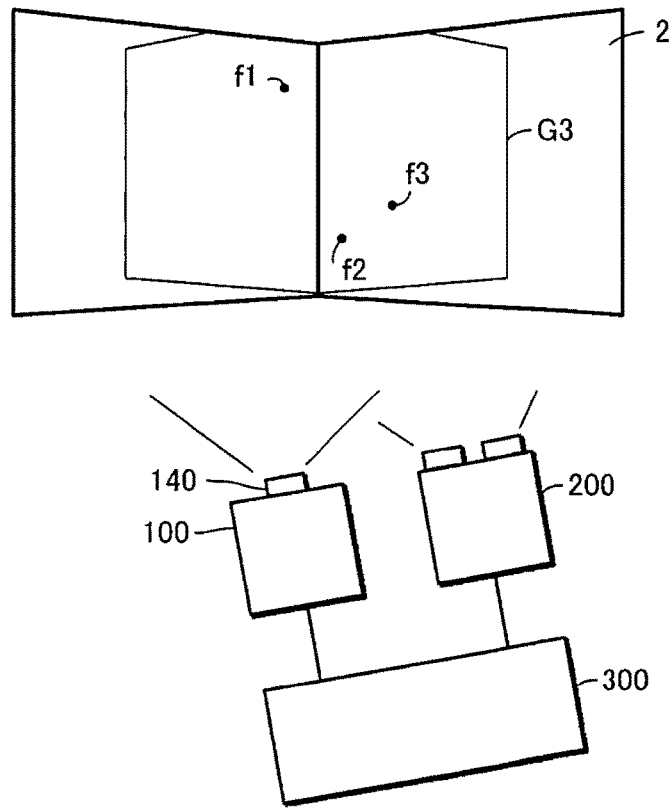
FIG. 14 is a diagram illustrating an example of a corresponding point.

The portion of the target object 2, at which the measurement point e of the measurement image G3 is located, is referred to as a "corresponding point f". FIG. 14 is a diagram illustrating an example of the corresponding point f. FIG. 14 illustrates three corresponding points f, specifically, a first corresponding point f1, a second corresponding point f2, and a third corresponding point f3. The corresponding point f is a point corresponding to the measurement point e of the measurement image G3. The first corresponding point f1 corresponds to the first measurement point e1. The second corresponding point f2 corresponds to the second measurement point e2. The third corresponding point f3 corresponds to the third measurement point e3.

The three-dimensional coordinates of the corresponding point f are referred to as "coordinates h". The coordinates h are the coordinates of the corresponding point f in the measuring instrument coordinate system CS2. The coordinates h are measured by the measuring instrument 200. The coordinates h are an example of first coordinates.

The two-dimensional coordinates of the measurement point e in the measurement image G3, that is, the coordinates of the measurement point e in the projector coordinate system CS1 are referred to as "coordinates i". The coordinates i are stored in advance in the second storage unit 330. The coordinates i are an example of second coordinates.

The description returns to FIG. 12. The first generation unit 345 generates first relation information j1 indicating the correspondence between the measuring instrument coordinate system CS2 and the projector coordinate system CS1. The first generation unit 345 generates the first relation information j1 based on the coordinates h being the three-dimensional coordinates of the corresponding point f in the measuring instrument coordinate system CS2 and the coordinates i being the two-dimensional coordinates of the measurement point e in the projector coordinate system CS1.

The second generation unit 346 generates second relation information j2 indicating the correspondence between the measuring instrument coordinate system CS2 and the virtual space coordinate system CS3.

The coordinates of the target point k of the target object 2 in the measuring instrument coordinate system CS2 are referred to as "coordinates m". The coordinates of the virtual target point q of the virtual target object 2v in the virtual space coordinate system CS3 are referred to as "coordinates n". The second generation unit 346 generates the second relation information j2 indicating the correspondence between the measuring instrument coordinate system CS2 and the virtual space coordinate system CS3, based on the coordinates m and the coordinates n.

The position specifying unit 347 specifies the position of the projector 100 in the virtual space coordinate system CS3 based on the coordinates of the projector 100 in the projector coordinate system CS1, by using the first relation information j1 and the second relation information j2. The position of the projector 100 in the virtual space coordinate system CS3 is referred to as a "first virtual position r1".

The virtual space control unit 348 controls the virtual space d1. The virtual space control unit 348 sets a second virtual position r2 in the virtual space d1. For example, the virtual space control unit 348 sets the second virtual position r2 in the virtual space d1 in response to a disposition instruction received from the user by the operation unit 310. The second virtual position r2 in the virtual space d1 corresponds to the position of the target object 2 in the measuring instrument coordinate system CS2. The virtual space control unit 348 disposes the virtual target object 2v at the second virtual position r2. The virtual space control unit 348 displays the original image G2 on the virtual target object 2v. Specifically, the virtual space control unit 348 displays the original image G2 on the virtual target object 2v so that it seems that virtual paper representing the original image G2 is adhered to the virtual target object 2v.

The virtual space control unit 348 disposes the virtual camera 400v at the first virtual position r1 in the virtual space d1, that is, at the position of the projector 100 in the virtual space coordinate system CS3. The virtual space control unit 348 causes the principal point of the virtual image pickup lens 410v in the virtual camera 400v to be located at the first virtual position r1.

The internal parameters of the virtual image pickup lens 410v are the same as the internal parameters of the projection lens 140 of the projector 100. The internal parameters of the virtual image pickup lens 410v represent the characteristics of the virtual image pickup lens 410v such as the focal length of the virtual image pickup lens 410v. The internal parameters of the projection lens 140 represent the characteristics of the projection lens 140 such as the focal length of the projection lens 140. In the present embodiment, the internal parameters of the projection lens 140 are known. The internal parameters of the projection lens 140 are stored in, for example, the second storage unit 330.

The image generation unit 349 generates a virtual pickup image obtained by the virtual camera 400v picking up the original image G2 displayed on the virtual target object 2v, as the deformed image G1. The image generation unit 349 generates, for example, image data indicating a virtual pickup image, as deformed image data indicating the deformed image G1.

A5: Measurement Image G3

Figure 15:
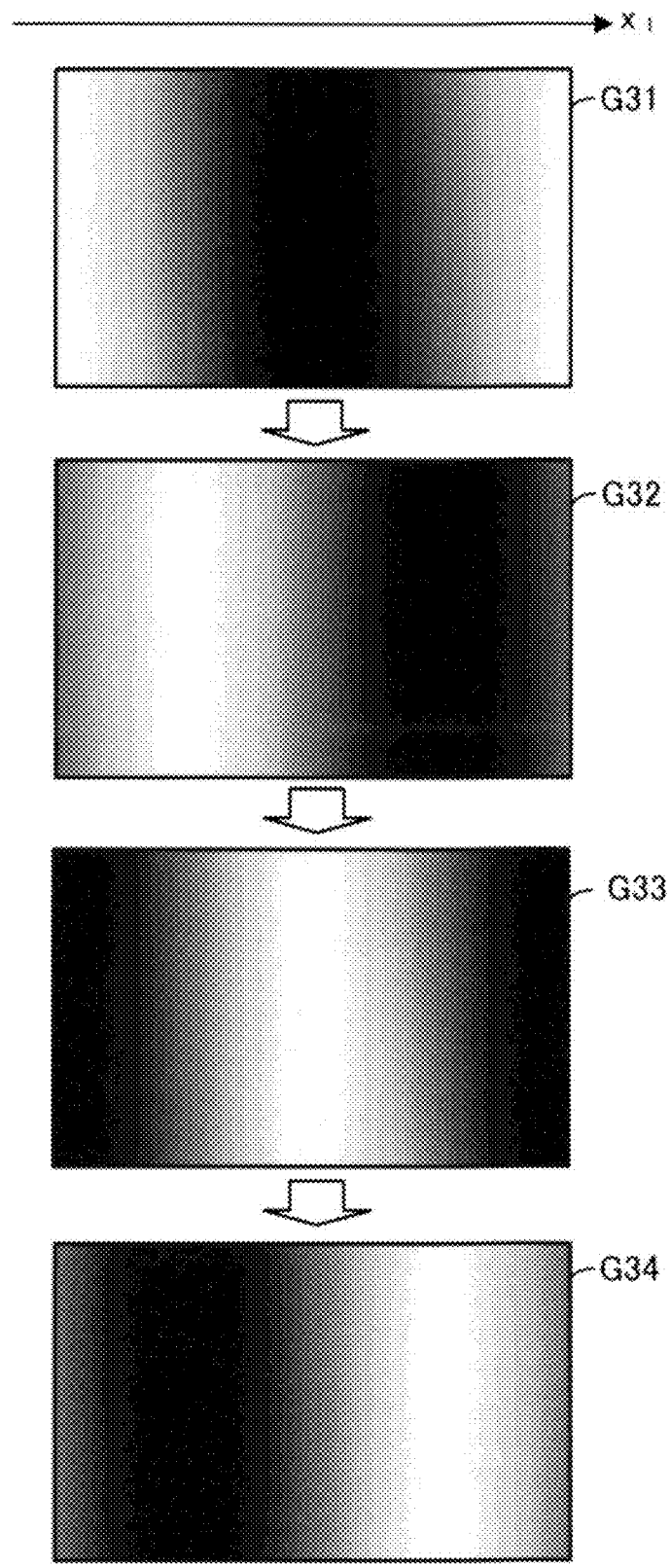
FIG. 15 is a diagram illustrating an example of a plurality of measurement images.

FIG. 15 is a diagram illustrating an example of a plurality of measurement images G3. The plurality of measurement images G3 include a first phase shift image G31 to a fourth phase shift image G34.

When it is not necessary to distinguish the first phase shift image G31 to the fourth phase shift image G34 from each other, each of the first phase shift image G31 to the fourth phase shift image G34 is referred to as a "phase shift image G30".

The phase shift image G30 is a pattern image showing a change in brightness in accordance with a sine wave in a direction along the $x_1$ axis of the projector coordinate system CS1. A sine wave has a concept that includes a cosine wave. The phase shift image G30 is used in the phase shift method.

The phase of the sine wave in the second phase shift image G32 is $\pi/2$ ahead of the phase of the sine wave in the first phase shift image G31. The phase of the sine wave in the third phase shift image G33 is $\pi$ ahead of the phase of the sine wave in the first phase shift image G31. The phase of the sine wave in the fourth phase shift image G34 is $3\pi/2$ ahead of the phase of the sine wave in the first phase shift image G31.

The phase shift image G30 is used to specify the corresponding point f. The corresponding point f is a portion at which the measurement point e of the phase shift image G30 is located on the target object 2 in a state where the projector 100 projects the phase shift image G30 onto the target object 2.

The phase shift method is used to specify a cell 212pt for observing the corresponding point f among the plurality of cells 212p in the first image sensor 212. The phase shift method is used to specify a cell 222pt for observing the corresponding point f among the plurality of cells 222p in the second image sensor 222. The cell 212pt and the cell 222pt are specified by using the phase of the sine wave in the phase shift image G30.

Figure 16:
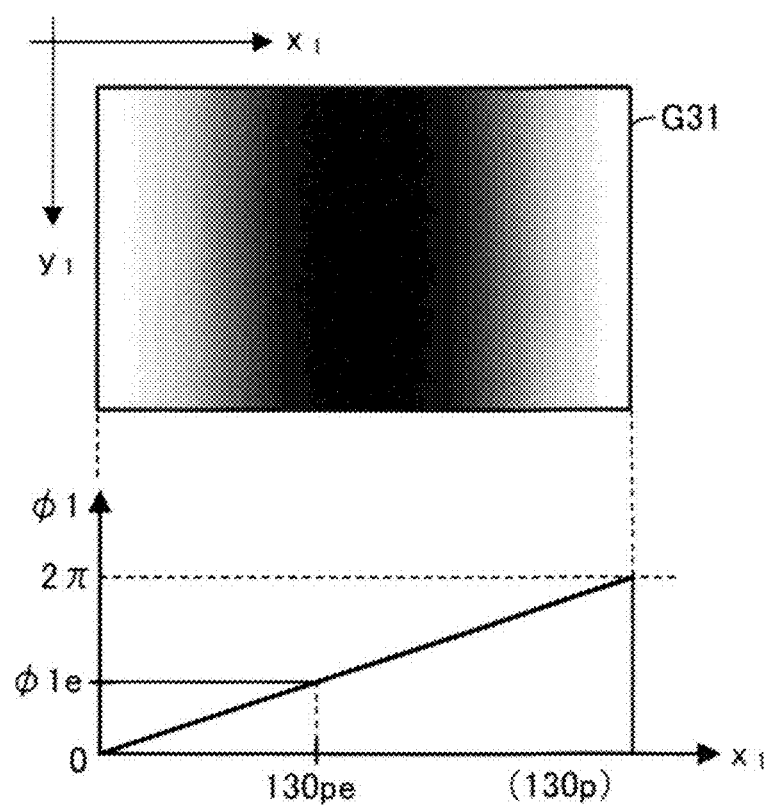
FIG. 16 is a diagram illustrating a relation between a pixel and a phase.

FIG. 16 is a diagram illustrating a relation between the pixels 130p arranged in the direction along the $x_1$ axis in the liquid crystal light bulb 130 and the phases cp1 of a sine wave corresponding to the brightness of the pixels 130p in a state where the projector 100 projects the first phase shift image G31.

As illustrated in FIG. 16, in the direction along the $x_1$ axis, the pixel 130p of the liquid crystal light bulb 130 and a phase φ1 have a one-to-one correspondence. Therefore, among the plurality of pixels 130p in the liquid crystal light bulb 130, a phase φ1e corresponding to a pixel 130pe located at the measurement point e is uniquely specified. In FIG. 16, for simplifying the description, only the pixel 130p located at the first measurement point e1 is illustrated as the pixel 130pe.

It is known that a phase φ2 of the sine wave corresponding to the brightness observed in any cell 212pi of the first image sensor 212 in a state where the first phase shift image G31 is projected is specified by Equation 1.

$$\varphi 2=\tan^{-1}\{(I_2-I_4)/(I_1-I_3)\} \qquad \text{Equation 1}$$

$I_1$ indicates the brightness observed by the cell 212*pi* in a state where the first phase shift image G31 is projected.

$I_2$ indicates the brightness observed by the cell 212*pi* in a state where the second phase shift image G32 is projected.

$I_3$ indicates the brightness observed by the cell 212*pi* in a state where the third phase shift image G33 is projected.

$I_4$ indicates the brightness observed by the cell 212*pi* in a state where the fourth phase shift image G34 is projected.

The cell 212*pt* specified by the phase shift method is a cell for observing the corresponding point f among the plurality of cells 212*p* in the first image sensor 212. Therefore, the phase φ2 corresponding to the brightness observed by the cell 212*pt* shows a value equal to a value of the phase φ1*e* corresponding to the brightness of the pixel 130*pe*. Thus, the search for the cell 212*pt* means searching the plurality of cells 212*p* for a cell for observing the brightness corresponding to the phase φ2 that shows a value equal to the value of the phase φ1*e* corresponding to the pixel 130*pe*.

Thus, among the plurality of cells 212*p*, it is possible to specify a coordinate cell group 212*px* having a coordinate $x_{2f}$ corresponding to a coordinate $x_{1f}$ where the corresponding point f is located in the $x_1$ axis coordinate of the projector coordinate system CS1.

Although not illustrated, the plurality of measurement images G3 further include a fifth phase shift image G35 to an eighth phase shift image G38. The fifth phase shift image G35 to the eighth phase shift image G38 are pattern images showing the change in brightness in accordance with the sine wave in a direction along the $y_1$ axis of the projector coordinate system CS1. The phase of the sine wave in the sixth phase shift image G36 is π/2 ahead of the phase of the sine wave in the fifth phase shift image G35. The phase of the sine wave in the seventh phase shift image G37 is π ahead of the phase of the sine wave in the fifth phase shift image G35. The phase of the sine wave in the eighth phase shift image G38 is 3π/2 ahead of the phase of the sine wave in the fifth phase shift image G35.

When the first camera 210 picks up the fifth phase shift image G35 to the eighth phase shift image G38, similar to a case using the first phase shift image G31 to the fourth phase shift image G34, it is possible to specify a coordinate cell group 212*py* having a coordinate $y_{2f}$ corresponding to a coordinate $y_{1f}$ where the corresponding point f is located in the $y_1$ axis coordinate of the projector coordinate system CS1, from the plurality of cells 212*p*.

Therefore, among the plurality of cells 212*p*, it is possible to specify the cell 212*p* having the coordinate $x_{2f}$ and the coordinate $y_{2f}$ as the cell 212*pt*.

The cell 222*pt* can be specified in the similar manner to the cell 222*pt*.

A6: Description of Operation

Figure 17:
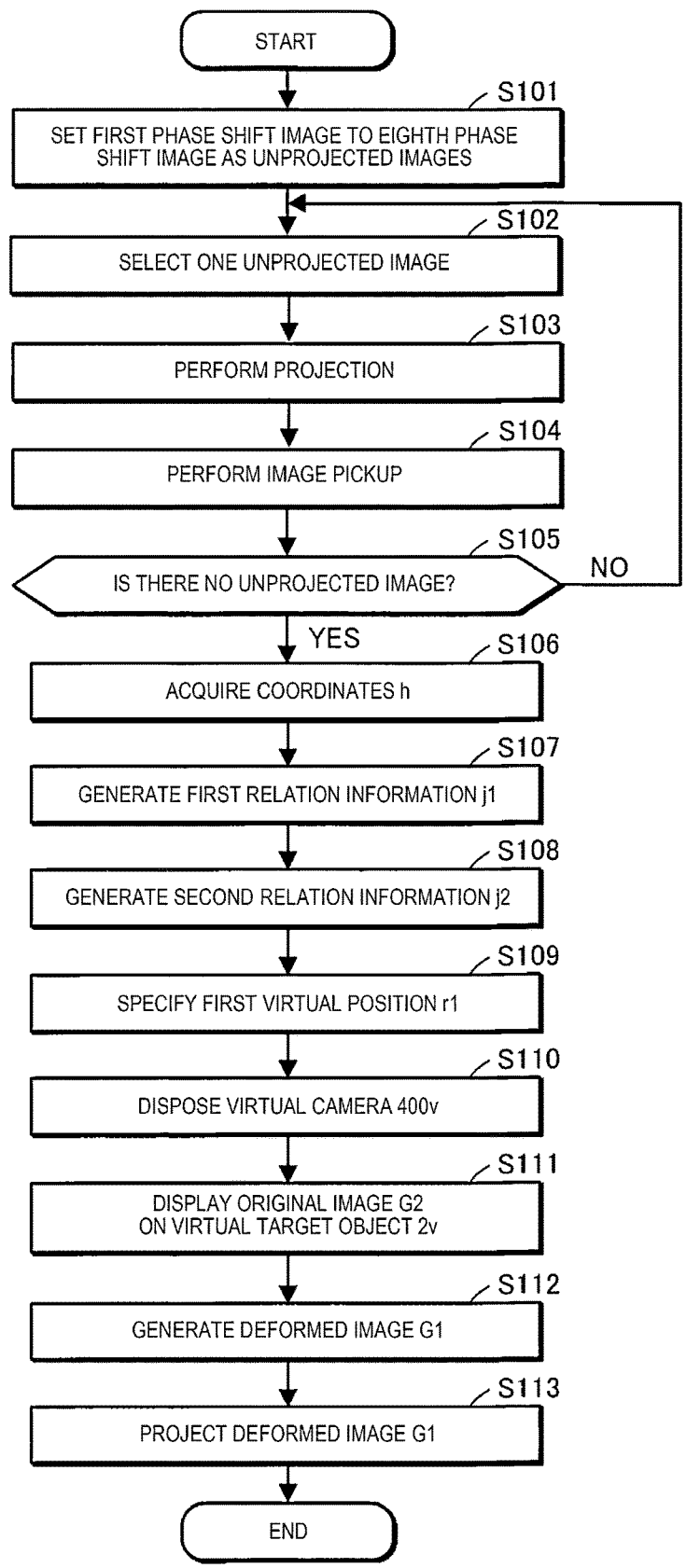
FIG. 17 is a diagram illustrating an operation of the projection system.

FIG. 17 is a diagram illustrating the operation of the projection system 1. The virtual space generation unit 341 generates a virtual space d1 in advance. The virtual space control unit 348 sets a second virtual position r2 in the virtual space d1 in advance. The virtual space control unit 348 disposes a virtual target object 2*v* at the second virtual position r2 in advance.

The user inputs a start instruction to the operation unit 310 by operating the operation unit 310. When receiving the start instruction, the operation unit 310 provides the start instruction for the second processing unit 340.

When the second processing unit 340 receives the start instruction, the projection control unit 342 sets a first phase shift image G31 to an eighth phase shift image G38 as unprojected images, in Step S101.

Then, in Step S102, the projection control unit 342 selects one unprojected image from the first phase shift image G31 to the eighth phase shift image G38. The projection control unit 342 selects the unprojected image in order of the first phase shift image G31, the second phase shift image G32, the third phase shift image G33, the fourth phase shift image G34, the fifth phase shift image G35, the sixth phase shift image G36, the seventh phase shift image G37, and the eighth phase shift image G38. The order of selecting the unprojected images is not limited to the order of the first phase shift image G31, the second phase shift image G32, the third phase shift image G33, the fourth phase shift image G34, the fifth phase shift image G35, the sixth phase shift image G36, the seventh phase shift image G37, and the eighth phase shift image G38. The order of selecting the unprojected images may be appropriately changed.

Then, the projection control unit 342 provides the projector 100 with image data a indicating the image selected in Step S102. When the image data a is stored in the second storage unit 330, the projection control unit 342 reads image data a from the second storage unit 330. The projection control unit 342 provides the projector 100 with the image data a read from the second storage unit 330. The projection control unit 342 may generate the image data a based on the second program P2. In this case, the projection control unit 342 provides the projector 100 with the generated image data a.

Then, the projection control unit 342 changes the setting for the image selected in Step S102 from the unprojected image to the projected image.

In Step S103, the projector 100 projects the image indicated by the image data a provided by the projection control unit 342, onto the target object 2.

In Step S104, the measurement control unit 343 causes the first camera 210 and the second camera 220 to pick up an image of the target object 2 on which the image is projected.

For example, the measurement control unit 343 provides the image pickup control unit 241 in the measuring instrument 200 with an image pickup instruction for instructing image pickup using the first camera 210 and the second camera 220. The image pickup control unit 241 causes the first camera 210 and the second camera 220 to pick up an image of the target object 2 on which the image is projected, in response to the image pickup instruction. The first camera 210 generate first pickup image data indicating the target object 2 on which the image is projected, by picking up the image of the target object 2 on which the image is projected. The first pickup image data is an example of the first image pickup data c1. The second camera 220 generate second pickup image data indicating the target object 2 on which the image is projected, by picking up the image of the target object 2 on which the image is projected. The second pickup image data is an example of the second image pickup data c2. The providing unit 242 provides the information processing apparatus 300 with the first pickup image data and the second pickup image data.

Then, in Step S105, the projection control unit 342 causes the process to return to Step S102 when there is an image set as the unprojected image among the first phase shift image G31 to the eighth phase shift image G38. Therefore, the first phase shift image G31 to the eighth phase shift image G38 are individually projected onto the target object 2 by the projector 100. In addition, the information processing apparatus 300 is provided with the first pickup image data of each of the first phase shift image G31 to the eighth phase shift image G38 and the second pickup image data of each of the first phase shift image G31 to the eighth phase shift image G38.

When there is no image set as the unprojected image among the first phase shift image G31 to the eighth phase shift image G38 in Step S105, the acquisition unit 344 acquires the coordinates h being three-dimensional coordinates of the corresponding point f in the measuring instrument coordinate system CS2, for each measurement point e in Step S106. The corresponding point f is a portion at which the measurement point e of the phase shift image G30 is located on the target object 2 in a state where the projector 100 projects the phase shift image G30 onto the target object 2.

In Step S106, the acquisition unit 344 first specifies a cell 212*pt* and a cell 222*pt* for each measurement point e. The cell 212*pt* is a cell for observing the corresponding point f among the plurality of cells 212*p* in the first image sensor 212. The cell 222*pt* is a cell for observing the corresponding point f among the plurality of cells 222*p* in the second image sensor 222.

The acquisition unit 344 specifies the cell 212*pt* for each measurement point e, based on coordinates i being the coordinates of the measurement point e in the projector coordinate system CS1 and the first pickup image data of each of the first phase shift image G31 to the eighth phase shift image G38. Since the second storage unit 330 stores the coordinates i, the acquisition unit 344 acquires the coordinates i from the second storage unit 330. The acquisition unit 344 specifies the cell 212*pt* for each measurement point e by using the phase shift method.

The acquisition unit 344 specifies the cell 222*pt* for each measurement point e, based on coordinates i being the coordinates of the measurement point e in the projector coordinate system. CS1 and the second pickup image data of each of the first phase shift image G31 to the eighth phase shift image G38. The acquisition unit 344 specifies the cell 222*pt* for each measurement point e by using the phase shift method.

When the acquisition unit 344 specifies the cell 212*pt* and the cell 222*pt* for each measurement point e, the acquisition unit 344 causes the measuring instrument 200 to perform three-dimensional measurement on each corresponding point f, using the measurement control unit 343.

For example, the acquisition unit 344 provides the calculation unit 243 in the measuring instrument 200 with a measurement instruction indicating the cell 212*pt* and the cell 222*pt* for each measurement point e, from the measurement control unit 343.

The calculation unit 243 calculates the three-dimensional coordinates of the corresponding point f in the measuring instrument coordinate system CS2, for each measurement point e, based on the position of the cell 212*pt* in the first image sensor 212 and the position of the cell 222*pt* in the second image sensor 222.

For example, the calculation unit 243 calculates a distance from the corresponding point f to the measuring instrument 200 based on the principle of triangulation, for each measurement point e. The calculation unit 243 performs the calculation based on the position of the cell 212*pt* and the position of the cell 222*pt*.

The calculation unit 243 uses the coordinate of the cell 212*pt* based on the $x_2$ axis, as the coordinate based on the $x_2$ axis from the three-dimensional coordinates of the corresponding point f in the measuring instrument coordinate system CS2. The calculation unit 243 uses the coordinate of the cell 212*pt* based on the $y_2$ axis, as the coordinate based on the $y_2$ axis among the three-dimensional coordinates of the corresponding point f in the measuring instrument coordinate system CS2. The calculation unit 243 uses a value based on the distance from the corresponding point f to the measuring instrument 200, as the coordinate based on the $z_2$ axis among the three-dimensional coordinates of the corresponding point f in the measuring instrument coordinate system CS2.

Then, the providing unit 242 provides the information processing apparatus 300 with the three-dimensional coordinates of the corresponding point f in the measuring instrument coordinate system CS2 for each measurement point e.

The acquisition unit 344 acquires the three-dimensional coordinates of the corresponding point f in the measuring instrument coordinate system CS2, as the coordinates h, from the providing unit 242 for each measurement point e.

Then, in Step S107, the first generation unit 345 generates first relation information j1 indicating the correspondence between the measuring instrument coordinate system CS2 and the projector coordinate system CS1.

For example, the first generation unit 345 generates the first relation information j1 based on the coordinates h being the three-dimensional coordinates of the corresponding point f in the measuring instrument coordinate system CS2 and the coordinates i being the two-dimensional coordinates of the measurement point e in the projector coordinate system CS1.

The first generation unit 345 acquires the coordinates h being three-dimensional coordinates, from the acquisition unit 344. Since the coordinates i being two-dimensional coordinates are stored in the second storage unit 330, the first generation unit 345 acquires the coordinates i being two-dimensional coordinates, from the second storage unit 330.

The first generation unit 345 generates the first relation information j1 by solving the perspective-n-points (PnP) problem by using a pair of the coordinates h being the three-dimensional coordinate and the coordinates i being the two-dimensional coordinate for each measurement point e. The pair of the coordinates h and the coordinates i is referred to as a "first coordinate pair" below.

For example, the first generation unit 345 solves the PnP problem by substituting the first coordinate pair for each measurement point e into Equation 2. Equation 2 is also referred to as a perspective projection transformation equation.

$$s\begin{bmatrix} u \\ v \\ 1 \end{bmatrix} = \begin{bmatrix} f_x & 0 & c_x \\ 0 & f_y & c_y \\ 0 & 0 & 1 \end{bmatrix} \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \begin{bmatrix} X \\ Y \\ Z \\ 1 \end{bmatrix} \quad \text{Equation 2}$$

Here, $\begin{bmatrix} f_x & 0 & c_x \\ 0 & f_y & c_y \\ 0 & 0 & 1 \end{bmatrix}$ is an internal parameter matrix A of the projection lens 140.

$\begin{bmatrix} r_{11} & r_{12} & r_{13} \\ r_{21} & r_{22} & r_{23} \\ r_{31} & r_{32} & r_{33} \end{bmatrix}$ is a rotation matrix R.

$\begin{bmatrix} t_1 \\ t_2 \\ t_3 \end{bmatrix}$ is a translation matrix T.

(X, Y, Z) represents the three-dimensional coordinates in the measuring instrument coordinate system CS2, for example, the coordinates h.

(u, v) represent the two-dimensional coordinates in the projector coordinate system CS1, for example, the coordinates i.

s indicates a scaling factor for realizing "1" in (u, v, 1). s=Z.

($c_x$, $c_y$) indicates the coordinates of the principal point of the projection lens 140.

$f_x$ and $f_y$ indicate the focal lengths of the projection lens 140 represented by the values of one pixel 130p as a unit.

In other words, $f_x$ and $f_y$ indicate the focal lengths of the projection lens 140 expressed in pixel units.

$f_x$ indicates the focal length of the projection lens 140 expressed in units based on the length of the pixel 130p in an $x_1$ axial direction.

$f_y$ indicates the focal length of the projection lens 140 expressed in units based on the length of the pixel 130p in a $y_1$ axial direction.

Equation 2 is equivalent to Equation 3.

$$\begin{bmatrix} x \\ y \\ z \end{bmatrix} = R \begin{bmatrix} X \\ Y \\ Z \end{bmatrix} + T \qquad \text{Equation 3}$$

$x' = x/z$
$y' = y/z$
$x'' = x'(1+k_1 r^2 + k_2 r^4 + k_3 r^6) + 2p_1 x'y' + p_2(r^2 + 2x'^2)$
$y'' = y'(1+k_1 r^2 + k_2 r^4 + k_3 r^6) + p_1(r^2 + 2y'^2) + 2p_2 x'y'$
Here,
$r^2 = x'^2 + y'^2$
$u = f_x \times x'' + c_x$
$v = f_y \times y'' + c_y$ $k_1$, $k_2$, and $k_3$ indicate distortion coefficients in the radial direction of the projection lens 140.

$p_1$, $p_2$ indicate distortion coefficients in the circumferential direction of the projection lens 140.

Each of the distortion coefficients belongs to the internal parameters of the projection lens 140.

The first generation unit 345 generates a plurality of equations by substituting the first coordinate pair into Equation 2 for each measurement point e. The first generation unit 345 specifies a rotation matrix R, a translation matrix T, and an internal parameter matrix A by solving the plurality of equations.

In the present embodiment, the internal parameters of the projection lens 140 are known. That is, the internal parameter matrix A is known. Therefore, the first generation unit 345 may specify the rotation matrix R and the translation matrix T by solving the plurality of equations. In this case, the first generation unit 345 can specify the rotation matrix R and the translation matrix T by using at least three first coordinate pairs.

The first generation unit 345 can specify the rotation matrix R and the translation matrix T as one solution, by using six or more first coordinate pairs.

The coordinates indicated by the first coordinate pair may include errors. Therefore, as the number of first coordinate pairs to be substituted into Equation 2 increases, the accuracy of the rotation matrix R and the translation matrix T is improved. Thus, it is desirable that the first generation unit 345 specifies the rotation matrix R and the translation matrix T by using more first coordinate pairs. The first generation unit 345 generates a group of the rotation matrix R, the translation matrix T, the internal parameter matrix A, and a scale factor s, as the first relation information j1.

Then, in Step S108, the second generation unit 346 generates second relation information j2 indicating the correspondence between the measuring instrument coordinate system CS2 and the virtual space coordinate system CS3.

The second generation unit 346 generates the second relation information j2 based on coordinates m being coordinates of a target point k in the target object 2 in the measuring instrument coordinate system CS2 and coordinates n being coordinates of a virtual target point q in the virtual target object 2v in the virtual space coordinate system CS3.

The second generation unit 346 acquires the coordinates m being the coordinates of the target point k in the target object 2 in the measuring instrument coordinate system CS2, from the measuring instrument 200.

For example, the second generation unit 346 causes the measuring instrument 200 to perform three-dimensional measurement on each target point k on the target object 2, by using the measurement control unit 343.

For example, the second generation unit 346 provides the calculation unit 243 in the measuring instrument 200 with an instruction to perform three-dimensional measurement on each target point k, from the measurement control unit 343.

The calculation unit 243 calculates the three-dimensional coordinates of each target point k in the measuring instrument coordinate system. CS2 in response to the instruction of the three-dimensional measurement on each target point k.

The calculation unit 243 uses the coordinate of the cell (for observing the target point k among the cells 212p in the first image sensor 212) based on the $x_2$ axis, as the coordinate based on the $x_2$ axis, from the three-dimensional coordinates of the target point k in the measuring instrument coordinate system CS2. The calculation unit 243 uses the coordinate of the cell (for observing the target point k among the cells 212p in the first image sensor 212) based on the $y_2$ axis, as the coordinate based on the $y_2$ axis, from the three-dimensional coordinates of the target point k in the measuring instrument coordinate system CS2. The calculation unit 243 calculates the distance from the target point k to the measuring instrument 200 by using the principle of triangulation. The calculation unit 243 uses a value based on the distance from the target point k to the measuring instrument 200, as the coordinate based on the $z_2$ axis among the three-dimensional coordinates of the target point k in the measuring instrument coordinate system CS2.

Then, the providing unit 242 provides the information processing apparatus 300 with the three-dimensional coordinates of the target point k in the measuring instrument coordinate system CS2 for each target point k.

The second generation unit 346 acquires the three-dimensional coordinates of the target point k in the measuring instrument coordinate system CS2, as the coordinates m, for each target point k from the providing unit 242.

The coordinates n being the coordinates of the virtual target point q in the virtual target object 2v in the virtual space coordinate system CS3 are managed by the virtual space control unit 348. Therefore, the second generation unit 346 acquires the coordinates n being the coordinates of the virtual target point q in the virtual space coordinate system CS3, for each virtual target point q in the virtual target object 2v, from the virtual space control unit 348.

The second generation unit 346 generates second relation information j2 by using a pair of the coordinates m of the target point k and the coordinates n of the virtual target point q corresponding to the target point k, for each target point k.

The pair of the coordinates m and the coordinates n is referred to as a "second coordinate pair" below.

The second generation unit 346 specifies a rotation matrix R1 and a translation matrix T1. In the rotation matrix R1, the orientation of the measuring instrument coordinate system CS2 is aligned to the orientation of the virtual space coordinate system CS3. In the translation matrix T1, the origin o2 of the measuring instrument coordinate system CS2 is aligned to an origin o3 of the virtual space coordinate system CS3. The rotation matrix R1 is a matrix of 3 rows and 3 columns. The translation matrix T1 is a matrix of 1 row and 3 columns.

Equation 4 shows the mutual relation between the measuring instrument coordinate system CS2, the virtual space coordinate system CS3, the rotation matrix R1, and the translation matrix T1.

$$\begin{bmatrix} Xv \\ Yv \\ Zv \end{bmatrix} = R1 \begin{bmatrix} X \\ Y \\ Z \end{bmatrix} + T1 \qquad \text{Equation 4}$$

(X, Y, Z) represents the three-dimensional coordinates in the measuring instrument coordinate system CS2, for example, the coordinates m.

($X_v$, $Y_v$, $Z_v$) represents the three-dimensional coordinates in the virtual space coordinate system CS3, for example, the coordinates n.

The second generation unit 346 generates a plurality of equations by substituting the second coordinate pair into Equation 4 for each target point k. The second generation unit 346 specifies the rotation matrix R1 and the translation matrix T1 by solving the plurality of equations. The second generation unit 346 generates a group of the rotation matrix R1 and the translation matrix T1, as the second relation information j2.

Then, in Step S109, the position specifying unit 347 specifies the first virtual position r1 being the position of the projector 100 in the virtual space coordinate system CS3, based on the coordinates of the projector 100 in the projector coordinate system CS1, by using the first relation information j1 and the second relation information j2.

First, the position specifying unit 347 specifies the position of the projector 100 in the measuring instrument coordinate system CS2 based on the coordinates of the projector 100 in the projector coordinate system CS1, by using the first relation information j1.

For example, the position specifying unit 347 transforms the two-dimensional coordinates of the projector 100 in the projector coordinate system CS1 into three-dimensional coordinates of the projector 100 in the measuring instrument coordinate system CS2, by using Equation 2 to which the first relation information j1 is applied. The position specifying unit 347 specifies the position indicated by the three-dimensional coordinates of the projector 100 in the measuring instrument coordinate system CS2, as the position of the projector 100 in the measuring instrument coordinate system CS2.

Then, the position specifying unit 347 specifies the position of the projector 100 in the virtual space coordinate system CS3 based on the three-dimensional coordinates of the projector 100 in the measuring instrument coordinate system CS2, by using the second relation information j2.

For example, the position specifying unit 347 transforms the three-dimensional coordinates of the projector 100 in the measuring instrument coordinate system CS2 into three-dimensional coordinates of the projector 100 in the virtual space coordinate system CS3, by using Equation 4 to which the second relation information j2 is applied. The position specifying unit 347 specifies the position indicated by the three-dimensional coordinates of the projector 100 in the virtual space coordinate system CS3, as the position of the projector 100 in the virtual space coordinate system CS3, that is, the first virtual position r1.

Then, in Step S110, the virtual space control unit 348 disposes the virtual camera 400v at the first virtual position r1.

In Step S110, the virtual space control unit 348 causes the principal point of the virtual image pickup lens 410v in the virtual camera 400v to be located at the first virtual position r1.

In Step S111, the virtual space control unit 348 displays the original image G2 which is not deformed, on the virtual target object 2v. The virtual space control unit 348 displays the original image G2 on the virtual target object 2v so that it seems that virtual paper representing the original image G2 is adhered to the virtual target object 2v.

In Step S112, the image generation unit 349 generates, as a deformed image G1, a virtual pickup image obtained in a manner that the virtual camera 400v picks up the original image G2 displayed on the virtual target object 2v. The virtual pickup image is an image in which the second deformation that cancels the first deformation that occurs in the original image G2 to be projected onto the target object 2 is performed on the original image G2. The image generation unit 349 generates image data indicating a virtual pickup image, as deformed image data indicating the deformed image G1.

Then, in Step S113, the projection control unit 342 causes the projector 100 to project the deformed image G1 onto the target object 2 by providing the projector 100 with deformed image data indicating the deformed image G1.

In a state where the deformed image G1 is projected onto the target object 2, the first deformation occurs in the deformed image G1 shown on the target object 2. Such first deformation cancels out the second deformation in the deformed image G1. Therefore, as illustrated in FIG. 5, the deformed image G1 is shown on the target object 2 in the similar form to the original image G2.

A7: Overview of Embodiment

The first generation unit 345 generates the first relation information j1 based on the three-dimensional coordinates h of the corresponding point f being the portion of the target object 2, at which the measurement point e is located, and the two-dimensional coordinates i of the measurement point e in the measurement image G3, in a state where the projector 100 projects the measurement image G3 onto the target object 2. The first relation information j1 indicates the correspondence between the measuring instrument coordinate system CS2 used by the measuring instrument 200 that specifies the coordinates h, and the projector coordinate system CS1 for defining the coordinates i and the coordinates of the projector 100. The position specifying unit 347 specifies the position of the projector 100 in the measuring instrument coordinate system CS2 based on the coordinates of the projector 100, by using the first relation information j1.

According to this aspect, even though the projector 100 and the measuring instrument 200 are disposed at any positions, it is possible to specify the position of the projector 100 in the measuring instrument coordinate system CS2 used by the measuring instrument 200. The position of the projector 100 in the measuring instrument coordinate system CS2 is information necessary for generating the deformed image G1. Thus, even though the projector 100 and the measuring instrument 200 are disposed at any positions, it is possible to support the projection of a predetermined image such as the deformed image G1 onto the target object 2.

The first generation unit 345 generates the first relation information j1 based on the three-dimensional coordinates h of the corresponding point f being the portion of the target object 2, at which the measurement point e is located, and the two-dimensional coordinates i of the measurement point e in the measurement image G3, in a state where the projector 100 projects the measurement image G3 onto the target object 2. The first relation information j1 indicates the correspondence between the measuring instrument coordinate system CS2 used by the measuring instrument 200 that specifies the coordinates h, and the projector coordinate system CS1 for defining the coordinates i and the coordinates of the projector 100. The second generation unit 346 generates the second relation information j2 based on the coordinates m of the target point k in the target object 2 in the measuring instrument coordinate system CS2 and the coordinates n of the virtual target point q corresponding to the target point k, in the three-dimensional virtual space d1. The second relation information j2 shows the correspondence between the measuring instrument coordinate system CS2 and the virtual space coordinate system CS3 for defining the coordinates in the virtual space d1. The position specifying unit 347 specifies the position of the projector 100 in the virtual space coordinate system CS3 based on the coordinates of the projector 100 by using the first relation information j1 and the second relation information j2.

According to this aspect, even though the projector 100 and the measuring instrument 200 are disposed at any positions, it is possible to specify the position of the projector 100 in the virtual space coordinate system CS3. Therefore, it is possible to generate a predetermined image such as the deformed image G1, based on the position of the projector 100 in the virtual space coordinate system CS3. Thus, even though the projector 100 and the measuring instrument 200 are disposed at any positions, it is possible to support the projection of a predetermined image such as the deformed image G1 onto the target object 2.

The acquisition unit 344 acquires the coordinates h from the measuring instrument 200 including the first camera 210 and the second camera 220. The measuring instrument 200 specifies the coordinates h based on the first pickup image generated in a manner that the first camera 210 picks up an image of the corresponding point f at which the measurement point e is located on the target object 2, and the second pickup image generated in a manner that the second camera 220 picks up an image of the corresponding point f at which the measurement point e is located on the target object 2. According to this aspect, it is possible to use a stereo camera as the measuring instrument 200. Therefore, the coordinates h are easily acquired.

The virtual space control unit 348 sets the second virtual position r2 corresponding to the position of the target object 2, in the virtual space d1. The virtual space control unit 348 disposes the virtual target object 2v corresponding to the target object 2, at the second virtual position r2 in the virtual space d1. The virtual space control unit 348 displays the original image G2 on the virtual target object 2v. The virtual space control unit 348 disposes the virtual camera 400v at the position of the projector 100 in the virtual space coordinate system CS3, in the virtual space d1. The image generation unit 349 generates the deformed image G1 obtained by the virtual camera 400v picking up the original image G2 displayed on the virtual target object 2v. According to this aspect, when the projector 100 projects an image onto the target object 2, it is possible to generate the deformed image G1 shown in the similar form to the original image G2.

The projection control unit 342 causes the projector 100 to project the deformed image G1 onto the target object 2. According to this aspect, it is possible to project an image onto the target object 2 in the similar form to the original image G2.

The measurement image G3 is the pattern image showing the change in brightness in accordance with a sine wave. According to this aspect, it is possible to use the phase shift image used in the so-called phase shift method, as the measurement image G3.

B: Modification Examples

The modification forms of the embodiment described above will be described below. Two or more forms randomly selected from the following examples may be appropriately combined in a range without contradicting each other.

B1: First Modification Example

In the embodiment, the first generation unit 345 may specify the rotation matrix R and the translation matrix T by using Equation 5 instead of Equation 2.

$$v2 \cdot (T \times Rv1) = 0 \qquad \text{Equation 5}$$

Equation 5 is referred to as the epipolar equation.

Figure 18:
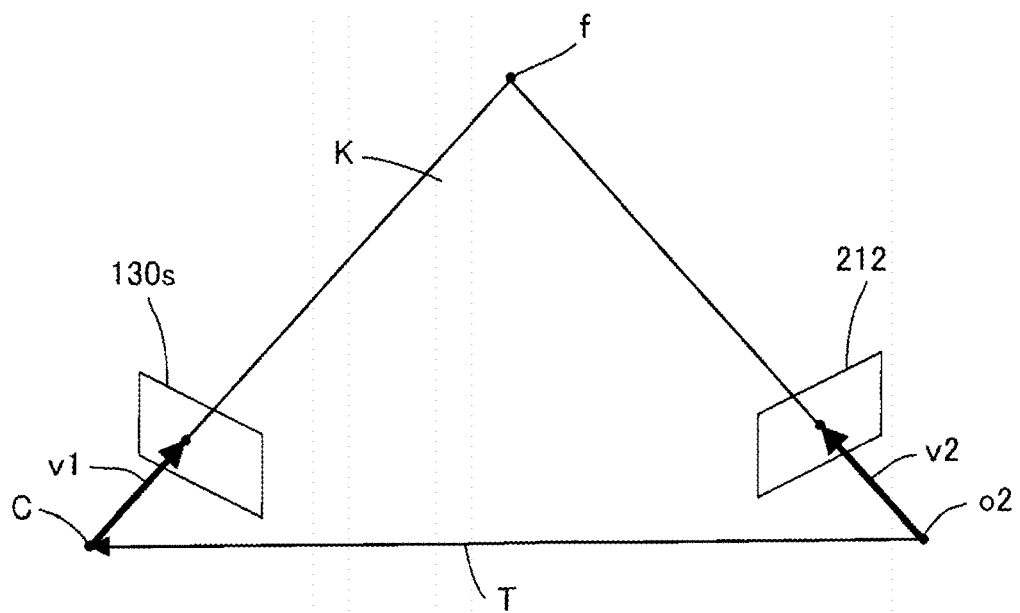
FIG. 18 is a diagram illustrating vectors.

FIG. 18 is a diagram illustrating vectors v1 and v2 shown in Equation 5. In a first modification example, the principal point of the projection lens 140 is not set in a two-dimensional plane 130s defined by the projector coordinate system CS1, but set at a position C being separated from the two-dimensional plane 130s in a direction along the $z_1$ axis by the focal length of the projection lens 140. In FIG. 18, for simplifying the description, the position of the two-dimensional plane 130s and the position of the first image sensor 212 are adjusted. In practice, the two-dimensional plane 130s exists at a position that is a point symmetric with respect to the position C. The first image sensor 212 exists at a position that is a point symmetric with respect to the origin o2.

The outer product of two vectors included in the epipolar plane K indicates a vector perpendicular to the epipolar plane K. Therefore, the inner product of the outer product of the two vectors included in the epipolar plane K and other vectors included in the epipolar plane K is "0". Equation 5 is defined based on such a relation.

The first generation unit 345 specifies a plurality of pairs of vectors v1 and v2 based on the plurality of first coordinate pairs. The pair of the vectors v1 and v2 is referred to as a "vector pair". The first generation unit 345 specifies the rotation matrix R and the translation matrix T by solving the epipolar equation of Equation 5 by using a plurality of vector pairs and a nonlinear least squares method or the like.

Equation 5 can constrain the direction of the vector defined by the translation matrix T. However, it is not possible for Equation 5 to constrain the magnitude of the vector defined by the translation matrix T. Therefore, the first generation unit 345 uses Equation 6 to define the magnitude of the vector defined by the translation matrix T.

$$\begin{bmatrix} x \\ y \\ z \end{bmatrix} = R \begin{bmatrix} X \\ Y \\ Z \end{bmatrix} + T \qquad \text{Equation 6}$$

In Equation 6, (x, y, z) is generated by transforming the two-dimensional coordinates in the projector coordinate system CS1 in the first coordinate pair into three-dimensional coordinates. The first generation unit 345 transforms the two-dimensional coordinates in the projector coordinate system CS1 in the first coordinate pair into the three-dimensional coordinates by using the focal length of the projection lens 140 as z in (x, y, z) in Equation 6.

According to the first modification example, it is possible to specify the rotation matrix R and the translation matrix T representing the relation between the projector coordinate system CS1 and the measuring instrument coordinate system CS2, by using the epipolar equation.

B2: Second Modification Example

In the embodiment and the first modification example, a zoom lens may be used as the projection lens 140 of the projector 100.

In this case, the internal parameters of the projection lens 140 change in accordance with the zoom state of the zoom lens. Therefore, when the first generation unit 345 uses equation 2, it is necessary to specify the internal parameter matrix A in addition to the rotation matrix R and the translation matrix T. In order to calculate the rotation matrix R, the translation matrix T, and the internal parameter matrix A by using Equation 2, at least 10 first coordinate pairs are required. Therefore, the first generation unit 345 specifies the rotation matrix R, the translation matrix T, and the internal parameter matrix A by using 10 or more first coordinate pairs.

The coordinates indicated by the first coordinate pair may include errors. Therefore, as the number of first coordinate pairs to be substituted into Equation 2 increases, the accuracy of the rotation matrix R, the translation matrix T, and the internal parameter matrix A is improved. Thus, it is desirable that the first generation unit 345 specifies the rotation matrix R, the translation matrix T, and the internal parameter matrix A by using more first coordinate pairs. The first generation unit 345 generates a group of the rotation matrix R, the translation matrix T, the internal parameter matrix A, and the scale factor s, as the first relation information j1.

According to the second modification example, it is possible to use a zoom lens as the projection lens 140.

B3: Third Modification Example

In the embodiment and the first modification example, an image pickup coordinate system being a two-dimensional coordinate system may be applied to the first image sensor 212 of the first camera 210.

In this case, the first generation unit 345 may generate first information indicating the correspondence between the projector coordinate system CS1 and the image pickup coordinate system. The second generation unit 346 may generate second information indicating the correspondence between the image pickup coordinate system and the virtual space coordinate system CS3. The position specifying unit 347 may specify the first virtual position r1 being the position of the projector 100 in the virtual space coordinate system CS3 based on the coordinates of the projector 100 in the projector coordinate system CS1, by using the first information and the second information.

For example, the first generation unit 345 generates the first information indicating the correspondence between the projector coordinate system CS1 and the image pickup coordinate system, by using a plurality of pairs of the two-dimensional coordinates of the measurement point e in the projector coordinate system CS1 and the two-dimensional coordinates of the corresponding point f in the image pickup coordinate system. The first information is, for example, a projective transformation matrix based on the projector coordinate system. CS1 and the image pickup coordinate system.

The second generation unit 346 generates the second information indicating the correspondence between the image pickup coordinate system and the virtual space coordinate system CS3, by using a plurality of pairs of two-dimensional coordinates of the target point k in the image pickup coordinate system and three-dimensional coordinates of the virtual target point q in the virtual space coordinate system CS3. The second generation unit 346 specifies an unknown number in Equation of the above-described perspective projection transformation, specifically, the rotation matrix R and the translation matrix T, by using a plurality of pairs of the two-dimensional coordinates of the target point k in the image pickup coordinate system and the three-dimensional coordinates of the virtual target point q in the virtual space coordinate system CS3. In this case, the second generation unit 346 applies the internal parameters of the first image pickup lens 211 to the internal parameter matrix A.

First, the position specifying unit 347 specifies the position of the projector 100 in the image pickup coordinate system based on the coordinates of the projector 100 in the projector coordinate system CS1, by using the first information.

Then, the position specifying unit 347 specifies the position of the projector 100 in the virtual space coordinate system CS3 based on the two-dimensional coordinates indicating the position of the projector 100 in the image pickup coordinate system, by using the second information.

The third modification example has the following aspects.

The first generation unit 345 generates the first information based on image pickup coordinates being the two-dimensional coordinates of the corresponding point f which is the portion of the pickup image (generated by the first camera 210 capturing an image of the target object 2), at which the measurement point e is located, and projection coordinates being two-dimensional coordinates of the measurement point e in the measurement image G3, in a state where the projector 100 projects the measurement image G3 onto the target object 2. The first information indicates the correspondence between a camera coordinate system for defining the image pickup coordinates and the projector coordinate system CS1 for defining the projection coordinates and the coordinates of the projector 100. The second generation unit 346 generates the second information based on coordinates of the target point k on the target object 2 in the camera coordinate system and coordinates of the virtual target point q corresponding to the target point k, in the three-dimensional virtual space d1. The second information indicates the correspondence between the camera coordinate system and the virtual space coordinate system CS3 which indicates the coordinates in the virtual space d1. The position specifying unit 347 specifies the position of the projector 100 in the virtual space coordinate system CS3 based on the coordinates of the projector 100 by using the first information and the second information.

According to the third modification example, even though the projector 100 and the first camera 210 are disposed at any positions, it is possible to specify the position of the projector 100 in the virtual space coordinate system CS3. Therefore, it is possible to generate a predetermined image such as the deformed image G1, based on the position of the projector 100 in the virtual space coordinate system CS3. Thus, even though the projector 100 and the first camera 210 are disposed at any positions, it is possible to support the projection of a predetermined image such as the deformed image G1 onto the target object 2. The second camera 220 can be omitted. The generation of the first relation information j1 and the second relation information j2 can be omitted.

B4: Fourth Modification Example

In the embodiment and the first to second modification examples, the origin o2 of the measuring instrument coordinate system CS2 is set at the position of the principal point of the first image pickup lens 211. Therefore, the coordinates of the first camera 210 in the measuring instrument coordinate system CS2 are known. Thus, the position specifying unit 347 can specify the coordinates of the first camera 210 in the virtual space coordinate system CS3 by using the second relation information j2.

The second generation unit 346 may update the second relation information j2 by using a virtual pickup image obtained when the virtual target object 2v is viewed with a viewing frustum having the internal parameters of the first camera 210, from the position of the first camera 210, which has the coordinates in the virtual space coordinate system CS3.

For example, the second generation unit 346 updates the second relation information j2 based on a target pickup image obtained by the first camera 210 picking up an image of the target object 2 and the virtual pickup image obtained when the virtual target object 2v is viewed with the viewing frustum having the internal parameters of the first camera 210, from the position of the first camera 210, which has the coordinates in the virtual space coordinate system CS3.

For example, the second generation unit 346 optimizes the second relation information j2 so that the sum of squares of the error between the position of the first target point k1 shown in the target pickup image and the position of the first virtual target point q1 shown in the virtual pickup image is minimized. The point used to specify the error is not limited to the first target point k1, but may be, for example, the second target point k2, or may be a point located in a region of the target object 2, in which an image is not projected from the projector 100. In the fourth modification example, it is premised that the internal parameters of the first camera 210 are known. When the method in the fourth modification example is applied to the third modification example, the second generation unit 346 optimizes the second information as described above instead of the second relation information j2.

According to the fourth modification example, it is possible to improve the accuracy of the second relation information j2 and the accuracy of the second information.

B5: Fifth Modification Example

In the fourth modification example, the virtual pickup image shows an image of a region including the image pickup range of the virtual camera 400v in the virtual target object 2v. Here, the internal parameters of the virtual image pickup lens 410v in the virtual camera 400v are equal to the internal parameters of the projection lens 140 in the projector 100. Therefore, the image pickup range of the virtual camera 400v is equal to the projection range for projecting an image when a virtual projector having the internal parameters similar to those of the projector 100 is disposed at the first virtual position r1. The three-dimensional coordinates of a plurality of points in a region of the virtual target object 2v, which serves as the image pickup range of the virtual camera 400v, in the virtual space coordinate system CS are known. The second generation unit 346 may update the second relation information j2 by using the known three-dimensional coordinates.

It is assumed that the target object 2 has a plurality of sample points having a one-to-one correspondence with a plurality of points included in the image pickup range of the virtual camera 400v in the virtual target object 2v. In this case, the second generation unit 346 causes the measuring instrument 200 to measure three-dimensional coordinates of the plurality of sample points in the measuring instrument coordinate system CS2. Then, the second generation unit 346 acquires the three-dimensional coordinates of the plurality of sample points in the measuring instrument coordinate system CS2, from the measuring instrument 200. The second generation unit 346 optimizes the second relation information j2 for each sample point to minimize the sum of squares of a difference between the three-dimensional coordinates of the sample point in the measuring instrument coordinate system CS2 and the three-dimensional coordinates of a point corresponding to the sample point in the virtual space coordinate system CS3. Since this method is matching of the outer shape using a point group of three-dimensional coordinates, this method is used when the region of the virtual target object 2v, which serves as the image pickup range of the virtual camera 400v is not a perfect plane.

According to the fifth modification example, it is possible to improve the accuracy of the second relation information j2.

B6: Sixth Modification Example

In the embodiment and the first to fifth modification examples, the position of the target point k may be the position of a feature point of the target object 2 instead of the position of the physical marker. The feature point is, for example, a bolt hole or a protrusion. In this case, the virtual target point q is set in accordance with the position of the feature point of the target object 2.

According to the sixth modification example, it is possible to use the feature point of the target object 2 as the target point k.

B7: Seventh Modification Example

In the embodiment and the first to sixth modification examples, the measurement image G3 is not limited to the phase shift image and can be appropriately changed. The measurement image G3 may be, for example, an image showing a mark at the position of the measurement point e.

Figure 19:
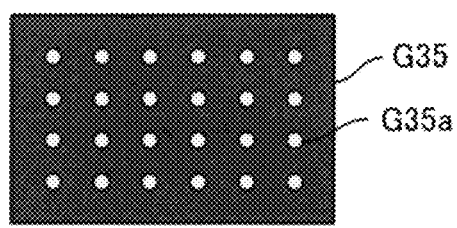
FIG. 19 is a diagram illustrating another example of the measurement image.

FIG. 19 is a diagram illustrating another example of the measurement image G3. FIG. 19 illustrates an image G35 showing a dot G35a at the position of the measurement point e. The center position of the dot G35a can be easily calculated by a method such as the detection of the center of gravity. Therefore, it is preferable that the center of the dot G35a is located at the position of each measurement point e. The mark is not limited to the dot G35a, and may be, for example, a polygonal mark or a mark having a shape in which two lines intersect with each other.

According to the seventh modification example, it is possible to reduce the number of measurement images G3 as compared with the configuration using the phase shift image.

B8: Eighth Modification Example

In the embodiment and the first to seventh modification examples, the information processing apparatus 300 may be incorporated in the projector 100 or the measuring instrument 200.

B9: Ninth Modification Example

In the embodiment and the first to eighth modification examples, the liquid crystal light bulb 130 is used as an example of an optical modulation device, but the optical modulation device is not limited to the liquid crystal light bulb and can be appropriately changed. For example, the optical modulation device may have a configuration such as a method using one digital mirror device. In addition to a liquid crystal panel and a DMD, a configuration capable of modulating light emitted by the light source 120 can be adopted as the optical modulation device.

What is claimed is:

1. A position specifying method comprising:
generating relation information based on first coordinates and second coordinates, the first coordinates indicating coordinates of a portion of a target object in three dimensions, at which a specific point is located, in a state where a projector projects a projection image including the specific point onto the target object, the second coordinates indicating coordinates of the specific point in the projection image in two dimensions, the relation information indicating a correspondence between a three-dimensional coordinate system and a projector coordinate system, the three-dimensional coordinate system being used by a measuring instrument that specifies the first coordinates, the projector coordinate system defining the second coordinates and coordinates of the projector;
specifying a position of the projector in the three-dimensional coordinate system based on the coordinates of the projector, by using the relation information;
setting a virtual position corresponding to a position of the target object, in a virtual space;
disposing a virtual target object corresponding to the target object, at the virtual position in the virtual space;
displaying a first image on the virtual target object;
disposing a virtual camera at the position of the projector in a virtual space coordinate system, in the virtual space; and
generating a second image obtained by the virtual camera picking up the first image displayed on the virtual target object.

2. A simulation method comprising:
generating first relation information based on first coordinates and second coordinates, the first coordinates indicating coordinates of a portion of a target object in three dimensions, at which a first specific point is located, in a state where a projector projects a projection image including the first specific point onto the target object, the second coordinates indicating coordinates of the first specific point in the projection image in two dimensions, the first relation information indicating a correspondence between a three-dimensional coordinate system and a projector coordinate system, the three-dimensional coordinate system being used by a measuring instrument that specifies the first coordinates, the projector coordinate system defining the second coordinates and coordinates of the projector;
generating second relation information based on coordinates of a second specific point in the target object in the three-dimensional coordinate system and coordinates of a third specific point corresponding to the second specific point, in a three-dimensional virtual space, the second relation information indicating a correspondence between the three-dimensional coordinate system and a virtual space coordinate system, the virtual space coordinate system defining coordinates in the virtual space;
specifying a position of the projector in the virtual space coordinate system based on the coordinates of the projector, by using the first relation information and the second relation information;
setting a virtual position corresponding to a position of the target object, in the virtual space;
disposing a virtual target object corresponding to the target object, at the virtual position in the virtual space;
displaying a first image on the virtual target object;
disposing a virtual camera at the position of the projector in the virtual space coordinate system, in the virtual space; and
generating a second image obtained by the virtual camera picking up the first image displayed on the virtual target object.

3. The simulation method according to claim 2, further comprising:
acquiring the first coordinates from a measuring instrument including a first camera and a second camera, wherein
the measuring instrument specifies the first coordinates based on a first pickup image and a second pickup image,
the first pickup image is generated in a manner that the first camera picks up an image of the portion of the target object, at which the first specific point is located, and
the second pickup image is generated in a manner that the second camera picks up an image of the portion of the target object, at which the first specific point is located.

4. The simulation method according to claim 2, further comprising:
projecting, by the projector, the second image onto the target object.

5. The simulation method according to claim 2, wherein the projection image is a pattern image showing a change in brightness in accordance with a sine wave.

6. The simulation method according to claim 2, wherein the projection image is an image showing a mark at a position of the first specific point.

7. A simulation method comprising:
generating first information based on image pickup coordinates and projection coordinates, the image pickup coordinates indicating two-dimensional coordinates of a portion of a pickup image, at which a first specific point is located, in a state where a projector projects a projection image including the first specific point onto a target object, the projection coordinates indicating two-dimensional coordinates of the first specific point in the projection image, the pickup image being generated by a camera capturing the target object, the first information indicating a correspondence between a camera coordinate system and a projector coordinate system, the camera coordinate system defining the image pickup coordinates, the projector coordinate system defining the projection coordinates and coordinates of the projector;
generating second information based on coordinates of a second specific point in the target object in the camera coordinate system and coordinates of a third specific point corresponding to the second specific point, in a three-dimensional virtual space, the second information indicating a correspondence between the camera coordinate system and a virtual space coordinate system, the virtual space coordinate system indicating coordinates in the virtual space;
specifying a position of the projector in the virtual space coordinate system based on the coordinates of the projector, by using the first information and the second information;

setting a virtual position corresponding to a position of the target object, in the virtual space;

disposing a virtual target object corresponding to the target object, at the virtual position in the virtual space;

displaying a first image on the virtual target object;

disposing a virtual camera at the position of the projector in the virtual space coordinate system, in the virtual space; and generating a second image obtained by the virtual camera picking up the first image displayed on the virtual target object.

8. The simulation method according to claim 7, further comprising:

projecting, by the projector, the second image onto the target object.

9. The simulation method according to claim 7, wherein the projection image is a pattern image showing a change in brightness in accordance with a sine wave.

10. The simulation method according to claim 7, wherein the projection image is an image showing a mark at a position of the first specific point.

\* \* \* \* \*